United States Patent
Hachiya et al.

(10) Patent No.: US 6,506,870 B1
(45) Date of Patent: Jan. 14, 2003

(54) POLYCARBONATE RESIN FOR USE IN THE PRODUCTION OF A SUBSTRATE FOR AN OPTICAL INFORMATION MEDIUM

(75) Inventors: Hiroshi Hachiya, Kurashiki (JP); Shinya Kawasoe, Moriyama (JP)

(73) Assignee: Asaki Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/559,629

(22) Filed: Apr. 27, 2000

(30) Foreign Application Priority Data

Apr. 27, 1999 (JP) ............................................ 11-119118
Apr. 28, 1999 (JP) ............................................ 11-123065

(51) Int. Cl.$^7$ ............................................. C08G 64/00
(52) U.S. Cl. ...................... 528/196; 428/64; 428/412; 528/198
(58) Field of Search ............................... 528/196, 198; 428/64, 412

(56) References Cited

U.S. PATENT DOCUMENTS

| 4,798,767 A | | 1/1989 | Aoki et al. ................. 428/412 |
| 4,845,193 A | * | 7/1989 | Umemura et al. .......... 528/502 |
| 4,880,896 A | | 11/1989 | Otsubo et al. .............. 528/196 |
| 5,932,683 A | | 8/1999 | Hachiya et al. ............. 528/196 |

FOREIGN PATENT DOCUMENTS

JP 4146922 5/1992

* cited by examiner

Primary Examiner—Terressa M. Boykin
(74) Attorney, Agent, or Firm—Birch, Stewart, Kolasch & Birch, LLP

(57) ABSTRACT

Disclosed is a substantially chlorine-free polycarbonate resin for use in the production of a substrate for an optical information medium, which is produced by transesterification reaction and which comprises a plurality of aromatic polycarbonate main chains, each comprising recurring units each independently represented by formula (1):

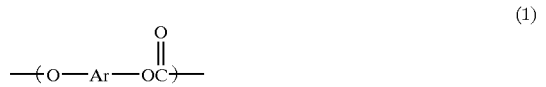

wherein the polycarbonate main chains collectively contain therein at least one heterounit (A) of formula (2):

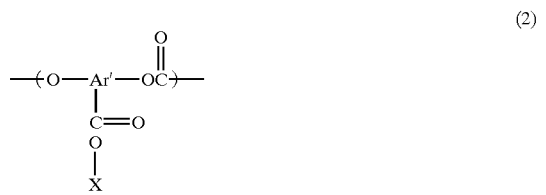

and at least one heterounit (B) of formula (3):

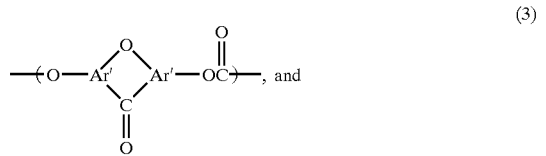

wherein the sum of the amounts of (A) and (B) is from 0.03 to 0.3 mole %, based on the total molar amount of units (1), and the amount of (A) is at least 50 mole %, based on the total molar amount of (A) and (B), the weight average molecular weight of the polycarbonate resin being from 13,000 to 18,000.

8 Claims, No Drawings

POLYCARBONATE RESIN FOR USE IN THE PRODUCTION OF A SUBSTRATE FOR AN OPTICAL INFORMATION MEDIUM

BACKGROUND OF THE INVENTION

1. Field of the Invention

The present invention relates to a polycarbonate resin for use in the production of a substrate for an optical information medium. More particularly, the present invention is concerned with a substantially chlorine-free polycarbonate resin which is produced by subjecting an aromatic dihydroxy compound and a carbonic diester to a transesterification reaction and which comprises a plurality of aromatic polycarbonate main chains which collectively contain specific heterounits (A) and (B), wherein the weight average molecular weight of the polycarbonate resin is from 13,000 to 18,000. The polycarbonate resin of the present invention exhibits a high melt fluidity during the injection molding thereof. By virtue of this property, the polycarbonate resin of the present invention can be advantageously used for producing an excellent substrate for an optical information medium, wherein the substrate has not only excellent optical properties, such as a low birefringence, but also a high precision transferability of information (that is, information of a stamper (a mold for forming microgrooves and micropits on a substrate) can be transferred to the substrate with high precision) (such a property is referred to as "high precision transferability"). Such a substrate can be advantageously used as a substrate for an optical information medium having a high recording density, such as a DVD. The present invention is also concerned with a polycarbonate resin composition comprising the above-mentioned polycarbonate resin and an acidic compound, and a substrate for an optical information medium, which is produced by molding the above-mentioned polycarbonate resin or the above-mentioned polycarbonate resin composition.

2. Prior Art

Polycarbonates have been widely used in various fields as engineering plastics having excellent heat resistance, impact resistance and transparency. Due to the recent expansion of information society, there has been a growing demand for polycarbonates to be used for producing storage media for music and image, and storage media for digital information (such as a storage medium for a personal computer). Nowadays, polycarbonates have become indispensable resins for producing optical disks and optical cards, such as a CD, a CD-ROM, CD-R, a DVD-ROM, a DVD-R, an MO and an MD.

In the production of a substrate for optical information medium, such as an optical disk, precise formation of microgrooves and micropits on the substrate is necessary. Polycarbonates for use in the production of such a substrate need to have a high transferability and excellent optical properties, such as a low birefringence. Therefore, low molecular weight polycarbonates having a weight average molecular weight of about 15,500 and having a high melt fluidity are used in the production of the substrates for the optical information media. In recent years, with respect to the storage media, conventional CD's are being replaced by DVD's which have a recording density much higher than the CD's. For producing substrates used in such optical information media having a high recording density, it is necessary to form very precise microgrooves and micropits on the substrate. Accordingly, as a resin for use in the production of a substrate for the optical information medium, the development of a polycarbonate which has a transferability higher than that of the conventional polycarbonates is demanded. In addition, due to the fact that the thickness of a substrate for a DVD (DVD substrate) is only about 0.6 mm which is very small as compared to the thickness (about 1.2 mm) of a substrate for a CD (CD substrate), there is also a growing demand for the development of a polycarbonate having a melt fluidity higher than that of the conventional polycarbonates. When a DVD substrate is produced from a polycarbonate, which has conventionally been used for producing the CD substrates, at a molding temperature employed in the conventional production of the CD substrates (i.e., about 300 to 320° C.), the melt fluidity of the polycarbonate is insufficient to obtain a satisfactory level of transferability. Therefore, in order to solve this problem, the DVD substrates are produced at a molding temperature as high as 380 to 390° C. so as to lower the melt viscosity of the polycarbonate. Such a molding temperature is too high and, hence, is not generally used for molding polycarbonates (the molding temperature in the production of molded articles other than optical information media is generally from 270 to 300° C., and the molding temperature in the production of the CD substrates is about 320° C.).

The use of such a high molding temperature causes problems, such as heat deterioration of a polycarbonate, long molding cycle, and large warpage of the produced substrate.

Further, with respect to the optical information media, there is especially a large demand for a storage medium capable of retaining the stored information for a prolonged period of time. Stability under conditions wherein both temperature and humidity are high is required for a storage medium to be able to retain the stored information for a prolonged period of time.

In the production of the substrates for the optical information media, polycarbonates produced by the phosgene process have conventionally been used. However, the use of the polycarbonates produced by the phosgene process in the production of the substrates for the optical information media is accompanied by the following problems: (1) phosgene used in this process is difficult to handle; (2) methylene chloride used as a solvent in this process causes polycarbonates to contain impurities (chlorine ions and residual methylene chloride) which not only adversely affects the thermal stability of the polycarbonates, but also causes corrosion of a mold used for the molding of the polycarbonates; and (3) the quality of the produced substrate for the optical information medium is poor.

In order to alleviate these problems accompanying the phosgene process polycarbonates, various proposals for polycarbonate compositions containing decreased amounts of the above-mentioned impurities and methods for decreasing the amounts of the impurities contained in the polycarbonates have been made in a number of documents, including Unexamined Japanese Patent Application Laid-Open Specification No. 63-316313 (corresponding to US Patent No. 4,880,896), Unexamined Japanese Patent Application Laid-Open Specification No. 4-146922, and Unexamined Japanese Patent Application Laid-Open Specification No. 63-97627 (corresponding to U.S. Pat. No. 4,798,767). However, when the molding of polycarbonates is conducted at a high temperature, methylene chloride remaining in a small amount in the polycarbonates is easily converted into hydrochloric acid. The removal of impurities by the conventional methods is unsatisfactory and, hence, it has been desired to develop a method for almost completely removing the impurities from polycarbonates.

On the other hand, since the complete removal of impurities from polycarbonates requires a great deal of labor, polycarbonates produced by the transesterification process, which uses no phosgene or methylene chloride, have recently been drawing attention.

However, the transesterification polycarbonates have the following problem. The transesterification polycarbonates contain a large amount of hydroxyl terminals as compared to the phosgene process polycarbonates (see "Kobunshi Bunseki Handbook (Handbook for Polymer Analysis)", page 345, published in 1985 by Asakura Shoten, Japan). Such polycarbonates suffer severe heat deterioration during the high temperature molding and, hence, cannot be used for producing a substrate for the optical information medium.

At the present, there is no transesterification polycarbonate which can be used for producing a substrate for the optical information medium, especially a high recording density medium, such as DVD, the production of which requires a molding at a high temperature. Therefore, the development of such a transesterification polycarbonate has been desired in the art.

SUMMARY OF THE INVENTION

In this situation, the present inventors have made extensive and intensive studies with a view toward solving the above-mentioned problems. As a result, it has been found that a substantially chlorine-free polycarbonate resin which is produced by subjecting an aromatic dihydroxy compound and a carbonic diester to a transesterification reaction, and which comprises a plurality of aromatic polycarbonate main chains which collectively contain specific heterounits (A) and (B), wherein the weight average molecular weight of the polycarbonate resin is from 13,000 to 18,000, can be advantageously used in the production of a substrate for an optical information medium. Specifically, it has been found that such a polycarbonate resin exhibits a high melt fluidity during the injection molding thereof and, hence, can be used for producing a substrate for an optical information medium, which has not only excellent optical properties, such as a low birefringence, but also a high precision transferability (i.e., information of a stamper (a mold for forming microgrooves and micropits on a substrate) is transferred to the substrate with high precision). Such a substrate can be advantageously used as a substrate for an optical information medium having a high recording density, such as a DVD.

Further, the present inventors have also found that, when a polycarbonate resin composition prepared by adding an acidic compound to the above-mentioned polycarbonate resin is molded, the occurrence of optical microdefects (craze-like defects having a maximum diameter of less than 200 μm which scatter or block the light) in the molded article can be satisfactorily suppressed even under conditions wherein both temperature and humidity are high.

The present invention has been completed, based on the above findings.

Accordingly, it is an object of the present invention to provide a polycarbonate resin which exhibits a high melt fluidity during the injection molding thereof and, hence, can be used for producing an excellent substrate for a optical medium, wherein the substrate has not only excellent optical properties, such as a low birefringence, but also a high precision transferability (i.e., information of a stamper (a mold for forming microgrooves and micropits on a substrate) is transferred to the substrate with high precision), so that the substrate can be advantageously used as a substrate for an optical information medium having a high recording density, such as a DVD.

It is another object of the present invention to provide a polycarbonate resin composition comprising the above-mentioned polycarbonate resin and an acidic compound.

It is still another object of the present invention to provide a substrate for an optical information medium, which is obtained by molding the above-mentioned polycarbonate resin or the above-mentioned polycarbonate resin composition.

The foregoing and other objects, features and advantages of the present invention will be apparent from the following detailed description and appended claims.

DETAILED DESCRIPTION OF THE INVENTION

According to the present invention, there is provided a polycarbonate resin for use in the production of a substrate for an optical information medium, which is produced by subjecting an aromatic dihydroxy compound and a carbonic diester to a transesterification reaction, and is substantially free of a chlorine atom, the polycarbonate resin comprising a plurality of aromatic polycarbonate main chains, each comprising recurring units each independently represented by the following formula (1):

(1)

wherein Ar represents a divalent $C_5$–$C_{200}$ aromatic group, wherein the plurality of aromatic polycarbonate main chains collectively contain therein at least one heterounit (A) and at least one heterounit (B), heterounit (A) being represented by the following formula (2):

(2)

wherein Ar' represents a trivalent $C_5$–$C_{200}$ aromatic group, and X represents a polycarbonate chain having recurring units each represented by the formula

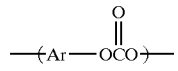

wherein Ar is as defined above and having a molecular weight of from 214 to 6,000, and wherein, when the polycarbonate main chains contain a plurality of heterounits (A), heterounits (A) are the same or different, heterounit (B) being represented by the following formula (3):

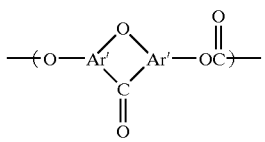

(3)

wherein Ar' is as defined above, and wherein, when the polycarbonate main chains contain a plurality of heterounits (B), heterounits (B) are the same or different, wherein X in formula (2) optionally contains at least one heterounit selected from the group consisting of heterounits (A) and (B), the sum of the amounts of heterounit (A) and heterounit (B) being from 0.03 to 0.3 mole %, based on the total molar amount of recurring units (1), the amount of heterounit (A) being at least 50 mole %, based on the total molar amount of heterounit (A) and heterounit (B), the polycarbonate resin having a weight average molecular weight of from 13,000 to 18,000.

For easy understanding of the present invention, the essential features and various embodiments of the present invention are enumerated below.

1. A polycarbonate resin for use in the production of a substrate for an optical information medium, which is produced by subjecting an aromatic dihydroxy compound and a carbonic diester to a transesterification reaction, and is substantially free of a chlorine atom, the polycarbonate resin comprising a plurality of aromatic polycarbonate main chains, each comprising recurring units each independently represented by the following formula (1):

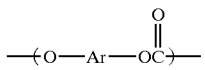

(1)

wherein Ar represents a divalent $C_5$–$C_{200}$ aromatic group, wherein the plurality of aromatic polycarbonate main chains collectively contain therein at least one heterounit (A) and at least one heterounit (B), heterounit (A) being represented by the following formula (2):

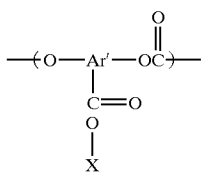

(2)

wherein Ar' represents a trivalent $C_5$–$C_{200}$ aromatic group, and X represents a polycarbonate chain having recurring units each represented by the formula

wherein Ar is as defined above and having a molecular weight of from 214 to 6,000, and wherein, when the polycarbonate main chains contain a plurality of heterounits (A), heterounits (A) are the same or different, heterounit (B) being represented by the following formula (3):

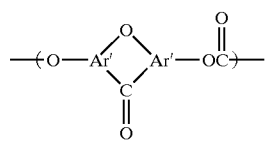

(3)

wherein Ar' is as defined above, and wherein, when the polycarbonate main chains contain a plurality of heterounits (B), heterounits (B) are the same or different, wherein X in formula (2) optionally contains at least one heterounit selected from the group consisting of heterounits (A) and (B), the sum of the amounts of heterounit (A) and heterounit (B) being from 0.03 to 0.3 mole %, based on the total molar amount of the recurring units (1), the amount of heterounit (A) being at least 50 mole %, based on the total molar amount of heterounit (A) and heterounit (B), the polycarbonate resin having a weight average molecular weight of from 13,000 to 18,000.

2. The polycarbonate resin according to item 1 above, which contains a particulate heat deterioration product in an amount of not more than 20 particles, relative to 100 g of the polycarbonate resin, each particle of the heat deterioration product having a particle size of 5 μm or more and having a heat deterioration degree of 0.2 or more as measured in terms of an absorption intensity ratio $A_1/A_2$, wherein $A_1$ represents the absorption intensity at the wave number of 1740 cm$^{-1}$, which is ascribed to the stretching vibration of a carbonyl group contained in the non-carbonate type ester linkage present in the polycarbonate resin, and $A_2$ represents the absorption intensity at the wave number of 1780 cm$^{-1}$, which is ascribed to the stretching vibration of a carbonyl group of the carbonate type ester linkage present in the polycarbonate resin, each absorption intensity being measured by infrared spectroscopy.

3. The polycarbonate resin according to item 1 above, wherein heterounit (A) is present in an amount of from 50 to 95 mole %, based on the total molar amount of heterounit (A) and heterounit (B).

4. The polycarbonate resin according to item 1 above, which has terminal hydroxyl groups in an amount of from 5 to 50 mole %, based on the total molar amount of the terminal groups of the polycarbonate resin.

5. The polycarbonate resin according to item 1 above, wherein 85% o r more of recurring units (1) are each represented by the following formula (1'):

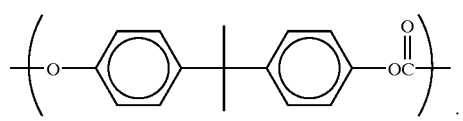

(1')

6. A substrate for an optical information medium, which is produced by molding the polycarbonate resin of item 1 above.

7. A polycarbonate resin composition for use in the production of a substrate for an optical information medium, comprising:
   (I) 100 parts by weight of the polycarbonate resin of item 1 above; and
   (II) $0.1 \times 10^{-4}$ to $100 \times 10^{-4}$ parts by weight of an acidic compound.
8. A substrate for an optical information medium, which is produced by molding the polycarbonate resin composition of item 7 above.

The polycarbonate resin of the present invention is a polycarbonate resin which is produced by subjecting an aromatic dihydroxy compound and a carbonic diester to a transesterification reaction, and is substantially free of a chlorine atom. With respect to the structure of the polycarbonate resin of the present invention, the polycarbonate resin comprises a plurality of aromatic polycarbonate main chains, each comprising recurring units each independently represented by formula (1) above, wherein the plurality of aromatic polycarbonate main chains collectively contain therein at least one heterounit (A) and at least one heterounit (B).

Heterounit (A) is represented by formula (2) above, wherein, when the polycarbonate main chains contain a plurality of heterounits (A), heterounits (A) are the same or different. Heterounit (B) is represented by formula (3) above, wherein, when the polycarbonate main chains contain a plurality of heterounits (B), heterounits (B) are the same or different.

In formulae (1), (2) and (3) above, each Ar independently represents a divalent $C_5$–$C_{200}$ aromatic group, and each Ar' independently represents a trivalent $C_5$–$C_{200}$ aromatic group which has a structure equivalent to Ar having one hydrogen atom thereof removed. Examples of divalent aromatic groups Ar include a phenylene group, a naphthylene group, a biphenylene group, a pyridylene group and a divalent aromatic group represented by the formula: —Ar$^1$—Q—Ar$^2$—, wherein each of Ar$^1$ and Ar$^2$ independently represents a divalent $C_5$–$C_{70}$ carbocyclic or heterocyclic aromatic group, and Q represents a divalent $C_1$–$C_{30}$ alkane group.

In the divalent aromatic groups Ar$^1$ and Ar$^2$, at least one hydrogen atom thereof may be replaced by a substituent such that it does not adversely affect the transesterification reaction for producing a polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Preferred examples of heterocyclic aromatic groups include an aromatic group having in a skeleton thereof at least one hetero atom, such as a nitrogen atom, an oxygen atom or a sulfur atom.

Examples of divalent aromatic groups Ar$^1$ and Ar$^2$ include an unsubstituted or substituted phenylene group, an unsubstituted or substituted biphenylene group and an unsubstituted or substituted pyridylene group. Substituents for Ar$^1$ and Ar$^2$ are as described above for heterocyclic aromatic groups.

Examples of divalent alkane groups Q include organic groups respectively represented by the following formulae:

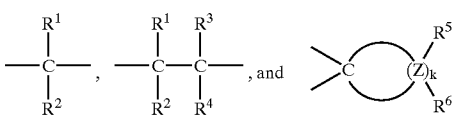

wherein each of $R^1$, $R^2$, $R^3$ and $R^4$ independently represents a hydrogen atom, an alkyl group having from 1 to 10 carbon atoms, an alkoxy group having from 1 to 10 carbon atoms, a cycloalkyl group having from 5 to 10 ring-forming carbon atoms, a carbocyclic aromatic group having from 5 to 10 ring-forming carbon atoms or a carbocyclic aralkyl group having from 6 to 10 ring-forming carbon atoms; k represents an integer of from 3 to 11; each Z represents a carbon atom and has $R^5$ and $R^6$ bonded thereto; each $R^5$ independently represents a hydrogen atom or an alkyl group having from 1 to 6 carbon atoms, and each $R^6$ independently represents a hydrogen atom or an alkyl group having from 1 to 6 carbon atoms; and wherein at least one hydrogen atom of each of $R^1$, $R^2$, $R^3$, $R^4$, $R^5$ and $R^6$ may be independently replaced by a substituent which does not adversely affect the transesterification reaction for producing a polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Specific examples of divalent aromatic groups Ar include groups respectively represented by the following formulae:

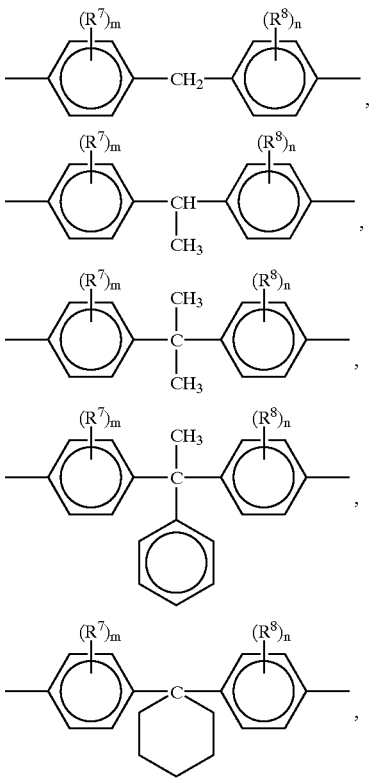

-continued

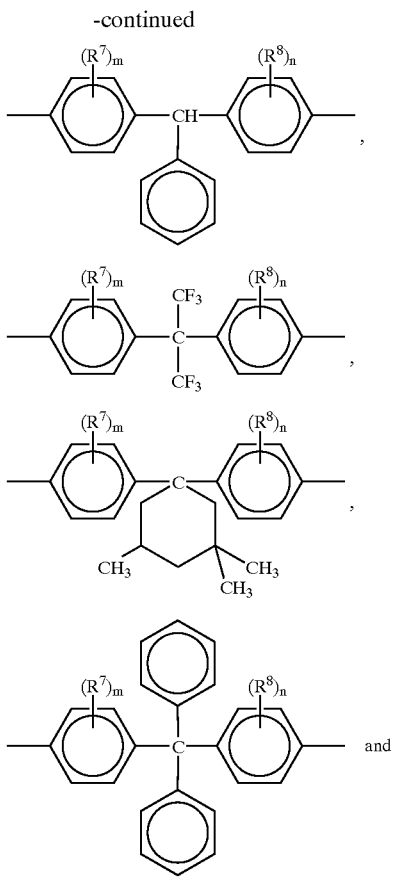

-continued

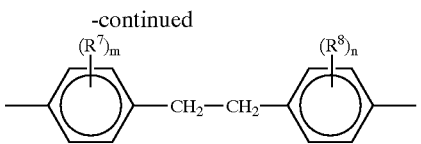

wherein each of $R^7$ and $R^8$ independently represents a hydrogen atom, a halogen atom, an alkyl group having from 1 to 10 carbon atoms, an alkoxy group having from 1 to 10 carbon atoms, a cycloalkyl group having from 5 to 10 ring-forming carbon atoms, or an phenyl group; each of m and n independently represents an integer of from 1 to 4, with the proviso that when m is an integer of from 2 to 4, the $R^7$'s are the same or different, and when n is an integer of from 2 to 4, the $R^8$'s are the same or different.

Further examples of divalent aromatic groups Ar include those which are represented by the following formula:

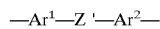

wherein $Ar^1$ and $Ar^2$ are as defined above; and Z' represents a single bond or a divalent group, such as —O—, —CO—, —S—, —SO$_2$—, —SO—, —COO—, and —CON($R^1$)—, wherein $R^1$ is as defined above.

Specific examples of such divalent aromatic groups Ar include groups respectively represented by the following formulae:

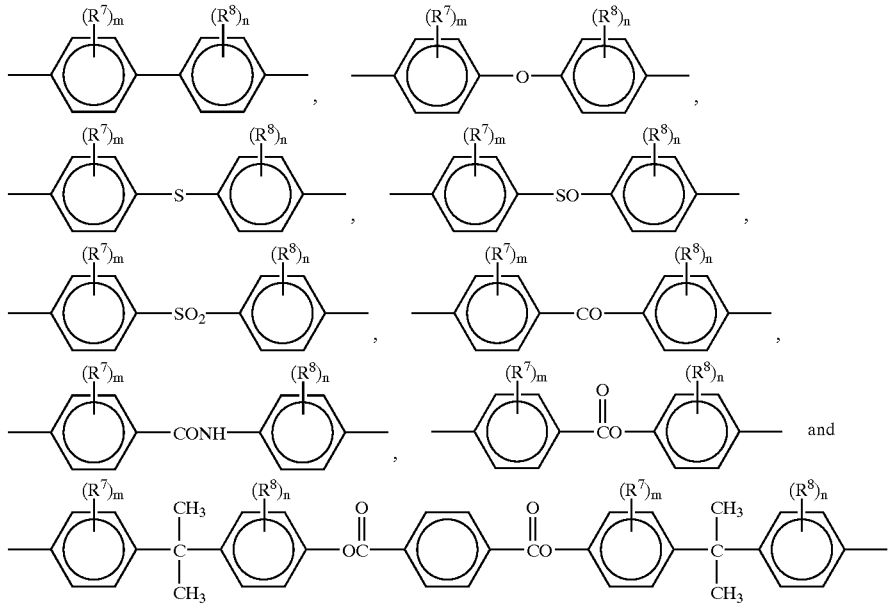

wherein $R^7$, $R^8$, m and n are as defined above.

In the present invention, these aromatic groups Ar may be used individually or in combination.

As a preferred example of recurring units of formula (1) above in the polycarbonate resin of the present invention, there can be mentioned a unit represented by the above-mentioned formula (1'), which is derived from bisphenol A. It is preferred that 85 mole % or more of the recurring units (1) are the units of formula (1').

With respect to heterounit (A), it is preferred that heterounit (A) is a unit derived from bisphenol A, which is represented by the following formula (2'):

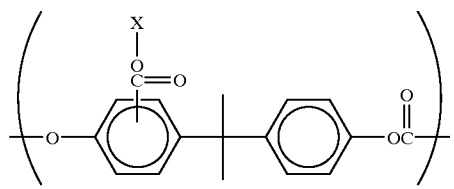

(2')

wherein X is as defined for formula (2).

With respect to heterounit (B), it is preferred that heterounit (B) is a unit derived from bisphenol A, which is represented by the following formula (3'):

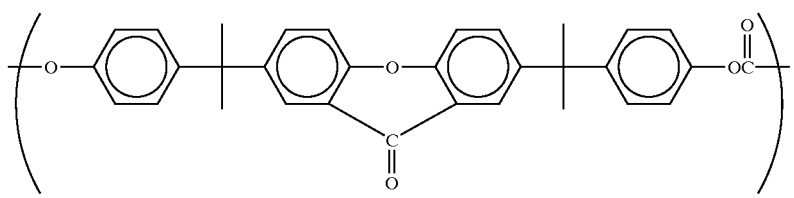

(3')

In the polycarbonate resin of the present invention, it is necessary that the sum of the amounts of heterounit (A) and heterounit (B) be in the range of from 0.03 to 0.3 mole %, preferably from 0.04 to 0.25 mole %, more preferably from 0.05 to 0.20 mole %, based on the total molar amount of recurring units (1). The amount of heterounit (A) is at least 50 mole %, preferably from 50 to 99 mole %, more preferably from 70 to 97 mole %, most preferably from 80 to 95 mole %, based on the total molar amount of heterounit (A) and heterounit (B). When the amount of heterounit (A) is less than the above-mentioned range, the melt fluidity of the polycarbonate resin cannot be satisfactorily improved, so that a high molding temperature is necessary for obtaining a satisfactory melt fluidity. However, as mentioned above, a high molding temperature causes problems, such as heat deterioration of the polycarbonate resin, a long molding cycle, and a large warpage of the molded article. On the other hand, when the amount of heterounit (A) is larger than the above-mentioned range, the polycarbonate resin exhibits an improved melt fluidity; however, a substrate obtained by molding the polycarbonate resin has a low mechanical strength and suffers optical defects under conditions wherein both temperature and humidity are high.

In addition to the above-mentioned heterounits (A) and (B), the polycarbonate resin of the present invention may optionally contain heterounits represented by the following formulae:

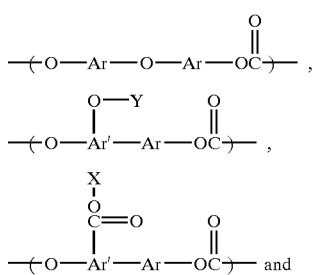

-continued

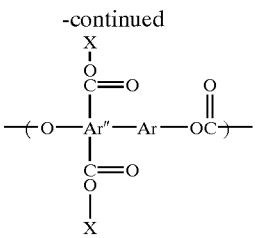

wherein, Ar, Ar' and X are as defined for formulae (1) and (2) above, Ar" represents a tetravalent $C_5$–$C_{200}$ aromatic group, and Y represents a polycarbonate chain having recurring units each represented by the formula

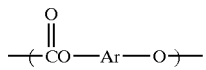

and having a molecular weight of from 214 to 6,000.

When bisphenol A is used as an aromatic dihydroxy compound, it is preferred that the above-mentioned optional heterounits have structures represented by the following formulae:

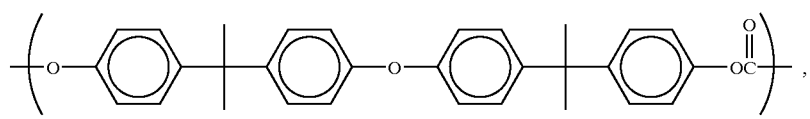

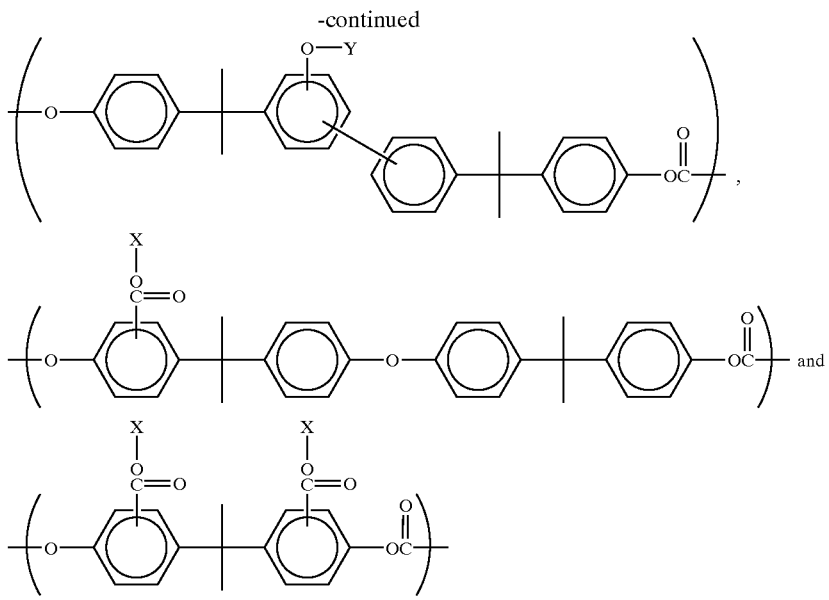

wherein X and Y are as defined above.

In the present invention, the determination of each of recurring units (1), and heterounits (A) and (B) can be conducted, for example, by a method in which the polycarbonate resin is completely hydrolyzed, and the resultant hydrolysis mixture is analyzed by reversed phase liquid chromatography (the analysis by reversed phase liquid chromatography can be conducted under the conditions as described below in the Examples). With respect to the hydrolysis of the polycarbonate resin, it is preferred that the hydrolysis is conducted at room temperature by the method described in "Polymer Degradation and Stability" 45 (1994), 127–137. The hydrolysis by this method is advantageous in that the complete hydrolysis of a polycarbonate resin can be achieved by simple operation without the danger of occurrence of side reactions during the hydrolysis. Further, when the polycarbonate resin contains the above-mentioned optional heterounits, the optional heterounits can also be determined by the above-mentioned method.

The polycarbonate resin of the present invention has a weight average molecular weight of from 13,000 to 18,000, preferably from 13,000 to 17,000, more preferably from 13,500 to 16,000. When the weight average molecular weight is larger than the above-mentioned range, the melt fluidity of the polycarbonate resin becomes unsatisfactory, so that the polycarbonate resin cannot be used for producing a substrate for an optical information medium having a high recording density, such as a DVD. When the weight average molecular weight is smaller than the above-mentioned range, the mechanical strength of the substrate produced by molding the polycarbonate resin becomes unsatisfactory. In the present invention, the weight average molecular weight of the polycarbonate resin can be measured by gel permeation chromatography (GPC) using tetrahydrofuran (as a solvent) and a polystyrene gel column. As a calibration curve, a modified calibration curve for a polycarbonate is used, which is obtain ed by modifying a calibration curve obtained with respect to standard monodisperse polystyrene samples, wherein the modification of the calibration curve is made by a calculation using the following formula:

$$M_{pc} = 0.3591 \, M_{ps}^{1.0388}$$

wherein $M_{pc}$ represents the molecular weight of the polycarbonate resin, and $M_{ps}$ represents the molecular weight of the standard polystyrene.

Generally, polycarbonate resins contain unfavorouble particulate heat deterioration product. In the present invention, it is preferred that the amount of a particulate heat deterioration product present in the polycarbonate resin is not more than 20 particles, relative to 100 g of the polycarbonate resin, wherein each particle of the heat deterioration product has a particle size of 5 μm or more and has a heat deterioration degree of 0.2 or more as measured in terms of an absorption intensity ratio $A_1/A_2$, wherein $A_1$ represents the absorption intensity at the wave number of 1740 cm$^{-1}$, which is ascribed to the stretching-vibration of a carbonyl group contained in the non-carbonate type ester linkage present in the polycarbonate resin, and $A_2$ represents the absorption intensity at the wave number of 1780 cm$^{-1}$, which is ascribed to the stretching vibration of a carbonyl group of the carbonate type ester linkage present in the polycarbonate resin, each absorption intensity being measured by infrared spectroscopy. The non-carbonate type ester linkage described above is formed by heat decomposition of the polycarbonate resin. The particle size of the particulate heat deterioration product is the maximum diameter of the particulate heat deterioration product. The above-mentioned particulate heat deterioration product is considered to be formed by the decomposition of the polycarbonate resin which is caused by heat during the production of the polycarbonate resin. When the polycarbonate resin contains the particulate heat deterioration product in an amount larger than the above-mentioned range, the mechanical strength of a substrate for an optical information medium, which is produced by molding the polycarbonate resin, is likely to be lowered. However, with respect to the particulate heat deterioration products having a heat deterioration degree $A_1/A_2$ of less than 0.2, the influence of such products on the mechanical strength of the substrate is considered to be small. In the present invention, since there are some variations and errors in the position of the stretching vibration frequency obtained by infrared spectroscopy, the absorption intensity value at the top of the peak appearing within the wave number range of 1740±15 cm$^{-1}$ (which is ascribed to the stretching vibration of a carbonyl group contained in the non-carbonate type ester linkage) is used as the absorption intensity $A_1$, and the absorption intensity value at the top of the peak appearing within the wave number range of 1780±15 cm$^{-1}$ (which is ascribed to the stretching vibration of a carbonyl group of the carbonate type ester linkage) is used as the absorption intensity $A_2$.

In the present invention, it is preferred that the polycarbonate resin has terminal hydroxyl groups in an amount of from 5 to 50 mole %, based on the total molar amount of the terminal groups of the polycarbonate resin. The amount of the terminal hydroxyl groups is more preferably from 10 to 40 mole %, most preferably from 15 to 30 mole %, based on the total molar amount of the terminal groups of the polycarbonate resin. When the amount of the terminal hydroxyl groups is less than the above-mentioned range, it becomes difficult to obtain a substrate having a uniform quality, and when the amount of the terminal hydroxyl groups is more than the above-mentioned range, the stability of the polycarbonate resin during a high temperature molding thereof tends to be lowered. In general, the amount of the terminal hydroxyl groups can be determined by a method where the amount of the terminal hydroxyl groups is measured by NMR or a method where the amount of the terminal hydroxyl groups is calculated from the molar amount of the terminal hydroxyl groups and the total molar amount of the terminal groups, which are measured by titanium method, UV method, or IR method. However, in the present invention, the amount of the terminal hydroxyl groups is determined by the following method. A polycarbonate resin is dissolved in methylene chloride acidified with acetic acid and, then, titanium tetrachloride is added thereto to thereby form a red complex. The absorbance of the red complex is measured at 546 nm to determine the molar amount of the terminal hydroxyl groups (this method is the so-called titanium method). The total amount of the terminal groups is determined from the average number molecular weight of the polycarbonate resin which is obtained by GPC.

Hereinbelow, the method for producing the polycarbonate resin of the present invention is explained.

As mentioned above, the polycarbonate resin of the present invention is produced by subjecting an aromatic dihydroxy compound and a carbonic diester to a transesterification reaction.

In the present invention, the term "aromatic dihydroxy compound" means a compound represented by the formula:

wherein Ar is as defined above. In the present invention, the aromatic dihydroxy compound may be a single type of aromatic dihydroxy compound or a combination of two or more types of aromatic dihydroxy compounds. It is preferred to use an aromatic dihydroxy compound in which the contents of a chlorine atom, an alkali metal and an alkaline earth metal are low. It is more preferred to use an aromatic dihydroxy compound substantially free of a chlorine atom, an alkali metal and an alkaline earth metal. Specifically, the content of a chlorine atom is preferably 0.5 ppm or less, and each of the contents of an alkali metal and an alkaline earth metal is preferably 0.1 ppm or less. The content of a chlorine atom can be measured by ion chromatography, and the contents of an alkali metal and an alkaline earth metal can be measured by atomic-absorption spectroscopy.

The carbonic diester used in the present invention is represented by the following formula:

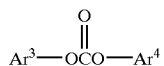

wherein each of $Ar^3$ and $Ar^4$ represents a monovalent $C_5$–$C_{200}$ aromatic group, and $Ar^3$ and $Ar^4$ may be the same or different.

In each of $Ar^3$ and $Ar^4$, which independently represents a monovalent carbocyclic or heterocyclic aromatic group, at least one hydrogen atom may be replaced by a substituent which does not adversely affect the transesterification reaction for producing the polycarbonate resin, such as a halogen atom, an alkyl group having from 1 to 10 carbon atoms, an alkoxy group having from 1 to 10 carbon atoms, a phenyl group, a phenoxy group, a vinyl group, a cyano group, an ester group, an amide group or a nitro group.

Representative examples of monovalent aromatic groups $Ar^3$ and $Ar^4$ include a phenyl group, a naphthyl group, a biphenyl group and a pyridyl group. These groups may or may not be substituted with the above-mentioned substitutent or substituents.

Preferred examples of monovalent aromatic groups as $Ar^3$ and $Ar^4$ include those which are respectively represented by the following formulae:

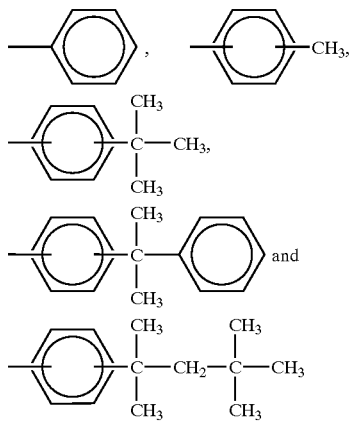

Representative examples of carbonic diesters include di(unsubstituted or substituted)phenyl carbonate compounds represented by the following formula:

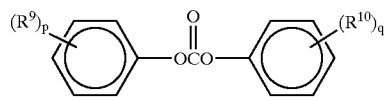

wherein each of $R^9$ and $R^{10}$ independently represents a hydrogen atom, an alkyl group having from 1 to 10 carbon atoms, an alkoxy group having from 1 to 10 carbon atoms, a cycloalkyl group having from 5 to 10 ring-forming carbon atoms or a phenyl group; each of p and q independently represents an integer of from 1 to 5, with the proviso that when p is an integer of 2 or more, the $R^9$'s are the same or different, and when q is an integer of from 2 or more, the $R^{10}$'s are the same or different.

Of these diphenyl carbonate compounds, preferred are those having a symmetrical configuration, for example, di(unsubstituted)phenyl carbonate and di(lower alkyl-substituted)phenyl carbonates, e.g., ditolyl carbonate and di-t-butylphenyl carbonate. Particularly preferred is diphenyl carbonate which has the simplest structure.

These carbonic diesters may be used individually or in combination. It is preferred that these carbonic diesters have a low content of a chlorine atom, an alkali metal or an alkaline earth metal. It is most preferred that these carbonic diesters are substantially free of a chlorine atom, an alkali metal and an alkaline earth metal. Specifically, the content of a chlorine atom is preferably 0.5 ppm or less, and each of the contents of an alkali metal and an alkaline earth metal is preferably 0.1 ppm or less. The content of a chlorine atom can be measured by ion chromatography, and the contents of an alkali metal and an alkaline earth metal can be measured by atomic-absorption spectroscopy.

In the production of the polycarbonate resin of the present invention, the ratio of the aromatic dihydroxy compound to the carbonic diester (i.e., a charging ratio) varies depending on the types of the aromatic dihydroxy compound and carbonic diester employed, the polymerization temperature and other polymerization conditions, and the desired molecular weight of a polycarbonate resin to be obtained and the desired proportions of the terminal groups in the polycarbonate. The carbonic diester is generally used in an amount of from 0.9 to 2.5 moles, preferably from 0.95 to 2.0 moles, more preferably from 0.98 to 1.5 moles, per mole of the aromatic dihydroxy compound.

In the present invention, an aromatic monohydroxy compound or an aliphatic alcohol may be used for changing the terminal groups, or adjusting the molecular weight of the polycarbonate resin.

In the present invention, the production of a polycarbonate resin is conducted by a t transesterification process which is a process wherein a condensation polymerization of the aromatic dihydroxy compound and the carbonic diester is performed by transesterification in the molten state or solid state while heating in the presence or absence of a catalyst under reduced pressure, under an inert gas flow or under both reduced pressure and an inert gas flow. The mode of the transesterification process, the polymerization equipment and the like are not specifically limited. For example, when a molten-state transesterification is employed, examples of reactors employable for performing the transesterification reaction include an agitation type reactor vessel, a wiped film type reactor, a centrifugal wiped film evaporation type reactor, a surface renewal type twin-screw kneading reactor, a twin-screw horizontal agitation type reactor, a wall-wetting fall reactor, a free-fall polymerizer having a perforated plate, and a wire-wetting fall polymerizer having a perforated plate and at least one wire provided in association with the perforated plate. The transesterification reaction can be easily performed using these various types of reactors individually or in combination. Further, for example, the transesterification reaction can also be performed by a method in which a molten-state transesterification is first conducted to obtain a prepolymer, and the obtained prepolymer is then subjected to a solid-state polymerization under reduced pressure, under an inert gas flow or under both reduced pressure and an inert gas flow, using a solid-state polymerizer.

With respect to materials for constructing these polymerizers used in the present invention, there is no particular limitation. However, stainless steel, nickel or glass is generally used as a material for at least inner wall portions of polymerizers.

As an illustrative example of the method for producing the polycarbonate resin of the present invention containing specific amounts of heterounits (A) and (B), there can be mentioned a first method where heterounits (A) and (B) are introduced into the polycarbonate main chains using a specific aromatic dihydroxy compound or an aromatic poly (tri or more)hydroxy compound, which, when subjected to a transesterification reaction with a carbonic diester, form heterounits represented by formulae (2) and (3). Alternatively, the polycarbonate resin of the present invention can be produced without using the above-mentioned specific compounds, specifically, by a second method where recurring units (1) of the polycarbonate main chains are converted into the heterounits during the polymerization process by choosing appropriate polymerization conditions, such as polymerization temperature, type of catalyst, and residence time. The above-mentioned two methods can be used in combination. In the present invention, it is preferred to use the above-mentioned second method, since this method enables a easy production of a polycarbonate resin which not only does substantially not suffer occurrence of optical defects even under conditions wherein both temperature and humidity are high, but also exhibits an excellent balance between the mechanical properties and the low temperature moldability.

It is generally known in the art that, during the production of a polycarbonate resin by transesterification reaction, an aromatic dihydroxy compound undergoes a reaction similar to the Kolbe-Schmitt reaction under the influence of an alkali to thereby form a heterounit represented by the following formula (a):

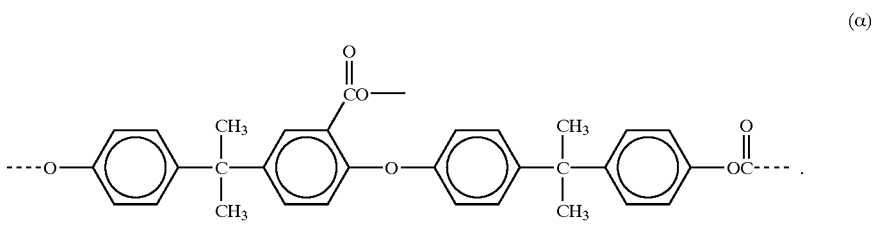

(α)

However, by regulating the reaction conditions, desired amounts of heterounit-(A) represented by the formula (2) and heterounit (B) represented by the formula (3) can be introduced into the polycarbonate main chains, while almost completely suppressing the formation of heterounit (a).

With respect to the above-mentioned second method for producing the polycarbonate resin of the present invention in which the heterounits are introduced by controlling the reaction conditions, it is preferred to use the method described in International Application Publication No. WO97/32916. As described in this publication, heterounits (A) and (B) are introduced into the polycarbonate main chains by controlling the relationship between the temperature and the residence time used for producing the polycarbonate resin. The longer the residence time of the polymerizable materials (i.e., a molten monomer mixture of an aromatic dihydroxy compound and a carbonic diester, and/or a molten prepolymer obtained by a process comprising reacting an aromatic dihydroxy compound with a carbonic diester) in a reaction zone having a high temperature, the larger the amounts of heterounits (A) and (B) introduced into the polycarbonate main chains. Especially, the amount of heterounit (B) introduced into the polycarbonate main chains tends to increase in accordance with the elevation of the reaction temperature. Therefore, desired amounts of heterounits can be introduced into the polycarbonate main chains by controlling the relationship between the temperature and the residence time of the polymerizable materials. In the present invention, in accordance with the technology described in the above-mentioned International Application Publication, a polycarbonate resin containing heterounits (A) and (B) in the above-mentioned specific amounts can be produced by strictly controlling the relationship between the temperature and the residence time used for producing the polycarbonate resin.

Specifically, it is preferred to employ a method in which at least one polymerizable material selected from the group consisting of a molten monomer mixture of an aromatic dihydroxy compound and a carbonic diester, and a molten prepolymer obtained by a process comprising reacting an aromatic dihydroxy compound with a carbonic diester, is subjected to a stepwise transesterification reaction, wherein the reaction conditions are controlled so as to satisfy the following formula (4):

$$0.2 \leq \sum_{i=1}^{n} (ki \times Ti \times Hi) \geq 1.2 \quad (4)$$

wherein:
  i represents the zone number assigned in an arbitrary order among n reaction zones of the reaction system,
  Ti represents the average temperature (° C.) of the polymerizable material in the i-th reaction zone,
  Hi represents the average residence time (hr) of the polymerizable material in the i-th reaction zone,
  ki represents a coefficient represented by the following formula (5):

$$ki = 1/(a \times Ti^{-b}) \quad (5)$$

wherein Ti is as defined above, and a and b depend on Ti, and wherein: when Ti satisfies the formula:

$$Ti < 240° C.,$$

a is $1.60046 \times 10^5$ and b is 0.472, when Ti satisfies the formula:

$$240° C. \leq Ti < 260° C.,$$

a is $4 \times 10^{49}$ and b is 19.107, and when Ti satisfies the formula:

$$260° C. \leq Ti,$$

a is $1 \times 10^{122}$ and b is 49.082.

The value of $$\sum_{i=1}^{n} (ki \times Ti \times Hi)$$

is preferably in the range of from 0.3 to 1.1, more preferably from 0.4 to 1.0.

Generally, in a process for continuously producing a polycarbonate resin by transesterification reaction, the transesterification reaction of the polymerizable material is stepwise conducted in a plurality of reaction zones, wherein the reaction temperature, residence time and reaction pressure are stepwise changed over the plurality of reaction zones involved in the process. The value of $$\sum_{i=1}^{n} (ki \times Ti \times Hi)$$

in formula (4) represents the sum of the values of (k×T×H) for all of the reaction zones. For example, when a continuous polymerization is performed using a system in which a vessel for melting and mixing an aromatic dihydroxy compound and a carbonic diester, an agitation type reactor vessel, a centrifugal wiped film evaporation type reactor and a surface renewal type twin screw kneading reactor are serially connected through conduits, $$\sum_{i=1}^{n} (ki \times Ti \times Hi)$$

is the sum of (k×T×H in the melting and mixing vessel), (k×T×H in the conduit connecting the melting and mixing vessel to the agitation type reactor vessel), (k×T×H in the agitation type reactor vessel), (k×T×H in the conduit connecting the agitation type reactor vessel to the centrifugal wiped film evaporation type reactor), (k×T×H in the centrifugal wiped film evaporation type reactor), (k ×T×H in the conduit connecting the centrifugal wiped film evaporation type reactor to the surface renewal type twin screw kneading reactor), (k×T×H in the surface renewal type twin screw kneading reactor) and (k×T×H in the conduit connecting the surface renewal type twin screw kneading reactor to a nozzle for withdrawal of the produced polymer), that is, the sum of values of (k×T×H) for all of the reaction zones including the conduits. The term "i-th reaction zone" means a reaction zone falling on the number i which is determined by the numbering system in which all reaction zones including conduits, such as a mixing vessel, a reactor or a conduit which connect these apparatuses, are assigned their respective numbers in the arbitrary order. When a heater is disposed on a conduit connecting two reactors to each other, the conduit segment between one of the reactors to the heater, the heater, and the conduit segment between the heater and the other reactor are each regarded as a reaction zone. The average temperature of the polymerizable material means the average temperature of the polymerizable material in the i-th reaction zone. When the polymerizable material in the i-th reaction zone has a temperature distribution wherein different portions have distinctly different temperatures, each of such different portions may be separately regarded as an i-th reaction zone. With respect to the measurement of the average temperature, various methods may be employed. For example, the average temperature can be obtained by averaging one or more temperatures measured by one or more thermometers disposed at a reactor or a conduit. When no thermometers are disposed at a reactor or a conduit, the temperature of a heating medium in a jacket may be used as the average temperature. Alternatively, the average temperature of the inlet and outlet of a jacket for circulating a heating medium, or the temperature which has been set for a heater or a heating medium may be employed as the average temperature of the polymerizable material in the i-th reaction zone. The average residence time is calculated by dividing the volume of the polymerizable material held in the i-th reaction zone by the volume of the polymerizable material passing through or withdrawn from the i-th reaction zone per unit time.

The reaction pressure used for producing the polycarbonate resin of the present invention is preferably selected within the range of from atmospheric pressure to 1 mmHg, and the reaction pressure may vary depending on the reaction zone. In the system employed for the polymerization reaction, the reaction pressure of the polymerizer used for conducting the reaction in the final stage is preferably 5 mmHg or less, more preferably 3 mmHg or less.

A transesterification reaction can be carried out in the absence of a catalyst. However, if it is desired to accelerate the polymerization, the polymerization can be effected in the presence of a catalyst. The polymerization catalysts which are customarily used in the art can be used without particular limitation. Examples of such catalysts include hydroxides of an alkali metal and of an alkaline earth metal, such as lithium hydroxide, sodium hydroxide, potassium hydroxide and calcium hydroxide; alkali metal salts of, alkaline earth metal salts of and quaternary ammonium salts of boron hydride and aluminum hydride, such as lithium aluminum hydride, sodium boron hydride and tetramethyl ammonium boron hydride; hydrides of an alkali metal and of an alkaline earth metal, such as lithium hydride, sodium hydride and calcium hydride; alkoxides of an alkali metal and of an alkaline earth metal, such as lithium methoxide, sodium ethoxide and calcium methoxide; aryloxides of an alkali metal and of an alkaline earth metal, such as lithium phenoxide, sodium phenoxide, magnesium phenoxide, LiO-Ar-OLi wherein Ar represents an arylene group, and NaO-Ar-ONa wherein Ar is as defined above; organic acid salts of an alkali metal and of an alkaline earth metal, such as lithium acetate, calcium acetate and sodium benzoate; zinc compounds, such as zinc oxide, zinc acetate and zinc phenoxide; boron compounds, such as boron oxide, boric acid, sodium borate, trimethyl borate, tributyl borate, triphenyl borate, ammonium borates represented by the formula: $(R^1 R^2 R^3 R^4)NB(R^1 R^2 R^3 R^4)$, and phosphonium borates represented by the formula: $(R^1 R^2 R^3 R^4)PB(R^1 R^2 R^3 R^4)$, wherein $R^1$, $R^2$, $R^3$ and $R^4$ are as defined above; silicon compounds, such as silicon oxide, sodium silicate, tetraalkylsilicon, tetraarylsilicon and diphenyl-ethyl-ethoxysilicon; germanium compounds, such as germanium oxide, germanium tetrachloride, germanium ethoxide and germanium phenoxide; tin compounds, such as tin oxide, dialkyltin oxide, dialkyltin carboxylate, tin acetate, tin compounds having an alkoxy group or aryloxy group bonded to tin, such as ethyltin tributoxide, and organotin compounds; lead compounds, such as lead oxide, lead acetate, lead carbonate, basic lead carbonate, and alkoxides and aryloxides of lead or organolead; onium compounds, such as a quaternary ammonium salt, a quaternary phosphonium salt and a quaternary arsonium salt; antimony compounds, such as antimony oxide and antimony acetate; manganese compounds, such as manganese acetate, manganese carbonate and manganese borate; titanium compounds, such as titanium oxide and titanium alkoxides and titanium aryloxide; and zirconium compounds, such as zirconium acetate, zirconium oxide, zirconium alkoxide, zirconium aryloxide and zirconium acetylacetone.

The catalysts can be used individually or in combination. The amount of the catalyst used is generally in the range of from $10^{-8}$ to 1% by weight, preferably from $10^{-7}$ to $10^{-1}$% by weight, more preferably from $10^{-6}$ to $10^{-2}$% by weight, based on the weight of the aromatic dihydroxy compound.

As mentioned above, the polycarbonate resin of the present invention is substantially free of a chlorine atom. Specifically, the content of a chlorine atom is ①0.5 ppm or less as measured by potential difference titration or ion chromatography using a silver nitrate solution and, at the same time, ② 10 ppm or less as measured by combustion method for determining a chlorine atom, wherein 10 ppm is the detection limit of the combustion method for determining the chlorine atom. It is preferred that the content of a chlorine atom is 0.1 ppm or less as measured by method ① above, wherein 0.1 ppm is the detection limit of method ①, and, at the same time, 10 ppm or less as measured by method ② above. In the transesterification method, when a polycarbonate resin is produced from an aromatic dihydoxy compound and a carbonic diester which are both substantially free of a chlorine atom, the produced polycarbonate resin is also substantially free of a chlorine atom unless a chlorine-containing compound is added thereto.

In another aspect of the present invention, there is provided a polycarbonate resin composition for use in the production of a substrate for an optical information medium, comprising:

(I) 100 parts by weight of the polycarbonate resin; and (II) $0.1 \times 10^{-4}$ to $100 \times 10^{-4}$ parts by weight of an acidic compound.

In general, it is known that the addition of an acidic compound to a polycarbonate resin tends to accelerate hydrolysis of the polycarbonate resin to thereby increase the opaqueness of the polycarbonate resin. The opaqueness of a polycarbonate resin is a phenomenon wherein the scattering of the light within the polycarbonate resin causes the polycarbonate to assume a white color, and is one of the optical defects The present inventors have studied this phenomenon by conducting the following experiment. A polycarbonate resin composition is produced by adding an acidic compound to a polycarbonate resin having an average molecular weight of approximately 2,300 to 2,600 (such a polycarbonate resin is generally used for injection molding). The produced polycarbonate resin composition is molded into a molded article having a thickness of approximately 3 mm. When the molded article is subjected to a steam test at 120° C., it is observed that the degree of opaqueness of the molded article is very high as compared to that of a molded article produced from a polycarbonate resin alone without addition of an acidic compound. Therefore, it is very surprising that the addition of an acidic compound to the polycarbonate resin of the present invention, which contains specific amounts of heterounits (A) and (B) and which has a weight average molecular weight of 1,300 to 18,00, greatly suppresses the occurrence of optical defects under conditions wherein both temperature and humidity are high.

There is no particular limitation with resect to the acidic compound contained in the polycarbonate resin composition of the present invention, except that phenolic compounds which is formed during the production of the polycarbonate resin are excluded from the acidic compound used in the present invention. As the acidic compound, compounds having pKa of 5 or less (solvent: water, or a mixed solvent of water and methanol) are preferably used. Examples of acidic compounds include inorganic acids, such as phosphoric acid, phosphorous acid, hypophosphorous acid, pyrophosphoric acid and boric acid; organic acids, such as adipic acid, citric acid and acetic acid; sulfonic acids, such as benzenesulfonic acid and p-toluenesulfonic acid; and sulfonic esters, such as ethyl benzenesulfonate and butyl p-toluenesulfonate. Of these, especially, phosphoric acid, citric acid and sulfonic esters are preferably used. The resin composition of the present invention contains an acidic compound in an amount of from $0.1 \times 10^{-4}$ to $100 \times 10^{-4}$ parts by weight, preferably from $0.4 \times 10^{-4}$ to $50 \times 10^{-4}$ parts by weight, more preferably $0.8 \times 10^{-4}$ to $20 \times 10^{-4}$ parts by weight, relative to 100 parts by weight of the polycarbonate resin. When the polycarbonate resin composition contains an acidic compound in an amount outside the above-mentioned range, a substrate for an optical information medium produced from such a polycarbonate resin composition suffers the optical microdefects under conditions wherein both temperature and humidity are high. With respect to the method for producing the polycarbonate resin composition of the present invention, the polycarbonate resin composition can be produced by a method in which an acidic compound is mixed with the polycarbonate resin immediately after the production thereof by the melt polymerization, while the polycarbonate resin is still in the molten state. Alternatively, the polycarbonate resin composition can be produced by a method in which an acidic compound is mixed with the pelletized polycarbonate resin and the resultant mixture is subjected to a melt-kneading. The amount of an acidic compound contained in the polycarbonate resin composition can be determined using conventional methods, such as NMR, atomic absorption, and liquid chromatography.

The resin composition of the present invention may optionally contain conventional additives other than the above-mentioned acidic compound in amounts as generally employed in the art. Examples of such conventional additives include a thermal stabilizer, an antioxidant, a weathering stabilizer, a UV light absorber, a mold release agent, a lubricant, an antistatic agent and a plasticizer. With respect to a method for introducing the conventional additive into the polycarbonate resin composition, the conventional additive may be mixed with the polycarbonate resin immediately after the production thereof, while the polycarbonate resin is still in the molten state. Alternatively, the conventional additive may be mixed with the pelletized polycarbonate resin or the pelletized polycarbonate resin composition, followed by subjecting the resultant mixture to a melt-kneading.

In still another aspect of the present invention, there is provided a substrate for an optical information medium, which is produced by molding the polycarbonate resin or polycarbonate resin composition of the present invention.

In the present invention, a "substrate for an optical information medium" means a substrate used for producing an optical information medium which is capable of optically recording and providing digital information using microgrooves and micropits formed on the substrate thereof. Specific examples of optical information media include, a CD, a CD-ROM, a CD-R, a CD-RW, a DVD-ROM, a DVD-R, a DVD-RW, an MD and an MO. In the present invention, there is no particular limitation with respect to a method for producing the substrate for an optical information medium. For example, the substrate may be produced by a method comprising the following steps (1) to (3):

(1) producing the above-mentioned polycarbonate resin or polycarbonate resin composition of the present invention;
(2) introducing the produced polycarbonate resin or polycarbonate resin composition into an injection molding machine designed for producing optical disks; and
(3) subjecting the polycarbonate resin or polycarbonate resin composition to an injection molding under conditions wherein the molding temperature is 300 to 370° C., the mold temperature is 50 to 130° C., and the molding cycle is 3 to 10 seconds.

As the injection molding machine used in this method, a conventional injection molding machine designed for producing optical disks can be used. The substrate of the present invention exhibits not only a high precision transferability (i.e., information of a stamper (a mold for forming microgrooves and micropits on a substrate) can be transferred to the substrate with high precision), but also a low birefringence. In addition, the substrate of the present invention not only does substantially not suffer occurrence of optical defects which cause an error in reading the digital information from the optical disk or an error in writing the digital information onto the disk, but also exhibits excellent mechanical strength and resistance to moist heat. By the virtue of these properties, the substrate of the present invention is suitable for producing an optical information medium capable of retaining the stored information for a prolonged period of time.

BEST MODE FOR CARRYING OUT THE INVENTION

The present invention will be further described in more detail with reference to the following Examples and Comparative Examples, which should not be construed as limiting the scope of the present invention.

In the following Examples and Comparative Examples, various properties were measured and evaluated as follows.
(1) Measurement of the Weight Average Molecular Weight of a Polycarbonate Resin:

The weight average molecular weight of a polycarbonate resin was measured by gel permeation chromatography (GPC) using tetrahydrofuran (as a solvent) and a polystyrene gel column. As a calibration curve, a modified calibration curve for a polycarbonate was used, which is obtained by modifying a calibration curve obtained with respect to standard monodisperse polystyrene samples, wherein the modification of the calibration curve is made by a calculation using the following formula:

$$M_{pc} = 0.3591\, M_{ps}^{1.0388}$$

wherein $M_{pc}$ represents the molecular weight of the polycarbonate resin, and $M_{ps}$ represents the molecular weight of the standard polystyrene.
(2) Determination of Recurring Unit (1), Heterounit (A) and Heterounit (B) in a Polycarbonate Resin:

55 mg of a polycarbonate resin was dissolved in 2 ml of tetrahydrofuran. To the resultant solution, 0.5 ml of 5 N solution of potassium hydroxide in methanol was added, and the solution was stirred at room temperature for 2 hours to completely hydrolyze the polycarbonate resin. The obtained mixture was mixed with 0.3 ml of concentrated hydrochloric acid and then, was subjected to reversed phase liquid chromatography.

The reversed phase liquid chromatography was performed, using a 991L UV detector (manufactured and sold by Waters Corporation, U.S.A.) and Inertsil ODS-3 column (registered trade mark, manufactured and sold by GL Science Inc., Japan). A mixture of methanol and 0.1 weight % aqueous solution of phosphoric acid was used as an eluent, and measurement was carried out by gradient elution technique at a gradient wherein the volume ratio (methanol/0.1 weight % aqueous solution of phosphoric acid) is changed from 20/80 at the start to 100/0.

The absorbance at 300 nm was measured using the UV detector. Absorbance coefficients for determining recurring unit (1), heterounit (A) and heterounit (B) were obtained by using standard compounds (as standard compounds, hydroxy compounds having structures formed by hydrolysis of recurring unit (1'), heterounit (2') and heterounit (3'), and hydroxy compounds having structures formed by methylating the carboxyl groups of the above-mentioned hydroxy compounds were used).

(3) Measurement of the Amount of Particulate Heat Deterioration Product Contained in a Polycarbonate Resin:

100 g of a polycarbonate resin was dissolved in 2 liters of methylene chloride, and the resultant mixture was subjected to a suction filtration using a Teflon filter (pore size: 1 μm). The polycarbonate resin remaining on the filter was washed away with 1 liter of methylene chloride, to thereby obtain particles of heat deterioration product on the filter. The particle size of each of the heat deterioration product particles was measured, and heat deterioration product particles having a particle size of 5 μm or more were taken using a micromanipulator (Micro Manipulator System, manufactured and sold by Shimadzu Corporation, Japan). With respect to each of the thus taken heat deterioration product particles having a particle size of 5 μm or more, the absorption intensity ratio $A_1/A_2$ was determined by infrared (IR) spectroscopy. "$A_1$" of the absorption intensity ratio represents the absorption intensity at the wave number of 1740 cm$^{-1}$, which is ascribed to the stretching vibration of a carbonyl group contained in the non-carbonate type ester linkage present in the polycarbonate resin (wherein the non-carbonate type ester linkage is caused by the heat decomposition of a polycarbonate resin), and "$A_2$" of the absorption intensity ratio represents the absorption intensity at the wave number of 1780 cm$^{-1}$, which is ascribed to the stretching vibration of a carbonyl group of the carbonate type ester linkage present in the polycarbonate resin. IR spectroscopy was performed as follows.

The heat deterioration product particles were crushed on a KBr (potassium bromide) infrared crystal plate to a thickness of 2 μm or less, and an infrared spectrum of each particle was measured by transmission method using an infrared microspectrometer (Fourier-Transform Infrared Micro-Spectrometer) (FTS 575C/UMA500 System, manufactured and sold by Nippon BIO-RAD Laboratories, Japan). Absorption intensity ratio $A_1/A_2$ was determined from the obtained spectrum.

Absorption intensity ratio $A_1/A_2$ was used as a heat deterioration degree, and the number of heat deterioration product particles having a heat deterioration degree of 0.2 or more was obtained.

(3) Measurement of the Amount of Terminal Hydroxyl Groups:

0.4 g of a polycarbonate resin was dissolved in 50 ml of methylene chloride to thereby obtain a solution. 10 ml of the obtained solution was transferred to a sample bottle having a capacity of 50 ml, and 12 ml of methylene chloride was added thereto and mixed well with the solution. To the resultant mixture was added 2 ml of titanium tetrachloride and 1 ml of acetic acid, and, then, the sample bottle was shaken to agitate the contents of the bottle. The resultant agitated mixture was used as a sample. The amount of terminal hydroxyl groups of a polycarbonate resin was determined by measuring the absorbance of the sample at 546 nm using a spectrophotometer (Spectrophotometer MPS-2000, manufactured and sold by Shimadzu Corporation, Japan). In order to prevent the samples from absorbing moisture, the measurement of the absorbance was conducted in nitrogen atmosphere. The amount of terminal hydroxyl groups of a polycarbonate resin, based on the total molar amount of the terminal groups of a polycarbonate resin, was calculated using the number average molecular weight of the polycarbonate resin which was determined by GPC.

(5) Evaluation of the Moldability of a Polycarbonate Resin or a Polycarbonate Resin Composition:

A disk-shaped substrate (thickness: 0.6 mm) for a DVD (hereinafter, simply referred to as a "DVD substrate disk") was produced by subjecting a polycarbonate resin or a polycarbonate resin composition to an injection molding, using an injection molding machine for producing optical disks (J35EL II-DK, manufactured and sold by THE JAPAN STEEL WORKS. LTD., Japan), at a molding temperature of 370° C. or 390° C., and a mold temperature of 120° C.

As a yardstick for the moldability, the birefringence and transferability of the produced DVD substrate disk were evaluated using a disk analyzing system (PRO-meteus, manufactured and sold by Dr. Schenk GmbH, Germany). The birefringence (nm) of a DVD substrate disk is defined by the difference between the maximum value and the minimum value of refractive index values as measured in the direction of the radius of the disk. It is desirable that the birefringence value of a DVD substrate disk is 20 nm or less.

The transferability (%) of a DVD substrate disk was calculated by the following formula:

$$\text{Transferability (\%)} = (D_1/D_2) \times 100$$

wherein $D_1$ represents the average value of groove depths as measured at a distance of 50 mm from the center of the disk, and $D_2$ represents the groove depth of the stamper used.

It is desirable that the transferability value of a DVD substrate disk is at least 95%.

(6) Evaluation of the Resistance to Moist Heat:

Three DVD substrate disks were produced by molding a polycarbonate resin at a molding temperature of 370° C. in the same manner as mentioned above for the evaluation of the moldability of a polycarbonate resin or a polycarbonate resin composition. The produced DVD substrate disks were allowed to stand at 90° C. under a relative humidity of 90% for 150 hours. The resultant substrate disks were observed through a magnifying lens to see whether or not the disks have a craze-like optical defect having a diameter of 200 μm or more. The evaluation of the resistance to moist heat was made in accordance with the following criteria.

○: Optical defect is not observed.

X: Optical defect is observed.

Further, three DVD substrate disks were produced by molding a polycarbonate resin composition at a molding temperature of 370° C. in the same manner as mentioned above for the evaluation of the moldability of a polycarbonate resin or a polycarbonate resin composition. The produced DVD substrate disks were allowed to stand at 110° C. under a relative humidity of 90% for 150 hours. The resultant substrate disks were observed through a magnifying lens to see whether or not the disks have a craze-like optical defect. More specifically, the number of optical defects having a diameter of 200 μm or more, and the number of optical microdefects having a diameter of less than 200 μm were individually measured.

(7) Mechanical Strength of a DVD Substrate Disk:

Ten DVD substrate disks were produced by molding a polycarbonate resin or a polycarbonate resin composition at a molding temperature of 370° C. in the same manner as mentioned above for the evaluation of the moldability of a polycarbonate resin or a polycarbonate resin composition. The mechanical strength of each substrate disk was evaluated by flexural test in which the distance between the supports was 40 mm and the bending of the disk was performed at a rate of 2 mm/second. The criteria for the evaluation of the mechanical strength are as follows.

X: At least five DVD substrate disks were broken before the flexural strength reached the yield point.

Δ: One to four DVD substrate disks were broken before the flexural strength reached the yield point.

○: No DVD substrate disk was broken before the flexural strength reached the yield point.

Example 1

A polycarbonate resin was produced by melt transesterification using a polymerizer system comprising first stage agitation type polymerizer vessels (A) and (B), second stage agitation type polymerizer vessel, third stage agitation type polymerizer vessel, first stage wire-wetting fall polymerizer equipped with 45 strands of 8 m long and 1.2 mmφ wires, and second stage wire-wetting fall polymerizer equipped with 45 strands of 8 m long and 1.2 mmφ wires, wherein the polymerizer vessels and the wire-wetting fall polymerizers are connected in series.

First stage agitation type polymerization was performed in first stage agitation type polymerizer vessels (A) and (B), each having a capacity of 100 liters, as follows. In first stage agitation type polymerizer vessels (A) and (B), which are used alternately, a polymerizable material comprising bisphenol A as an aromatic dihydroxy compound and diphenyl carbonate as a carbonic diester (the molar ratio of diphenyl carbonate to bisphenol A:1.10) was subjected to melt polymerization in the presence of a disodium salt of bisphenol A as a catalyst (the molar ratio of the disodium salt of bisphenol A to bisphenol A:8×10$^{-8}$) at a temperature of 180° C. under atmospheric pressure, thereby obtaining prepolymer 1.

The obtained prepolymer 1 was fed to the second stage agitation type polymerizer vessel having a capacity of 50 liters at a flow rate of 8 kg/hr. In the second stage agitation type polymerizer vessel, prepolymer 1 was subjected to second stage agitation type polymerization at 230° C. under a pressure of 100 mmHg, thereby obtaining prepolymer 2.

The obtained prepolymer 2 was continuously fed to the third stage agitation type polymerizer vessel having a capacity of 50 liters. In the third stage agitation type polymerizer vessel, prepolymer 2 was subjected to third stage agitation type polymerization at 240° C. under a pressure of 20 mmHg, thereby obtaining prepolymer 3.

The obtained prepolymer 3 was continuously fed to the first stage wire-wetting fall polymerizer equipped with 45 strands of 8 m long and 1.2 mmφ wires. In the first stage wire-wetting fall polymerizer, prepolymer 3 was subjected to first wire-wetting fall polymerization at 265° C. under a pressure of 3 mmHg, thereby obtaining prepolymer 4.

The obtained prepolymer 4 was continuously fed to the second stage wire-wetting fall polymerizer equipped with 45 strands of 8 m long and 1.2 mmφ wires. In the second stage wire-wetting fall polymerizer, prepolymer 4 was subjected to second stage wire-wetting fall polymerization at 265° C. under a pressure of 0.5 mmHg, thereby obtaining a polycarbonate resin.

The obtained polycarbonate resin was fed into a twin-screw type extruder (PCM30, manufactured and sold by IKEGAI CORP, Japan) (temperature: 250° C.) which is connected to the second stage wire-wetting fall polymerizer, to thereby obtain polycarbonate resin pellets.

The temperatures, the residence times and the values of (ki×Ti×Hi) in the agitation type polymerizer vessels, the wire-wetting fall polymerizers and the conduits are shown in Table 1, together with the values of $$\sum_{i=1}^{n} (ki \times Ti \times Hi).$$

Various properties of the obtained polycarbonate resin were evaluated in accordance with the above-mentioned evaluation methods. The results are shown in Table 7.

Further, using the obtained polycarbonate resin, disk-shaped substrates for a DVD were produced by the above-mentioned production method, and the properties of the produced substrates were evaluated in accordance with the above-mentioned evaluation methods. The results are shown in Table 8.

As can be seen from Table 8, the obtained polycarbonate resin had excellent moldability even at a temperature of 370° C. Specifically, as shown in Table 8, the DVD substrate disks produced from the obtained polycarbonate resin had not only 100% transferability, but also excellent birefringence. Further, the DVD substrate disks had excellent resistance to moist heat, and excellent mechanical strength.

Example 2

A polycarbonate resin was continuously produced in substantially the same manner as in Example 1, except that the reaction conditions were changed as follows. A polymerizable material comprising bisphenol A and diphenyl carbonate, wherein the molar ratio of diphenyl carbonate to bisphenol A was 1.15, was used. Prepolymer 1 was fed to the second stage agitation type polymerizer vessel at a flow rate of 4.8 kg/hr. Further, a flange positioned between the first stage wire-wetting fall polymerizer and the second stage wire-wetting fall polymerizer was heated to 290° C. The reaction conditions are shown in Table 2.

Various properties of the obtained polycarbonate resin were evaluated in accordance with the above-mentioned evaluation methods. The results are shown in Table 7.

Further, using the obtained polycarbonate resin, disk-shaped substrates for DVD were produced by the above-mentioned production method, and the properties of the produced substrates were evaluated in accordance with the above-mentioned evaluation methods. The results are shown in Table 8.

As can be seen from Table 8, the obtained polycarbonate resin had excellent moldability even at 370° C. Specifically, even though one of the disks broke during the evaluation of the mechanical strength, the DVD substrate disks produced using the obtained polycarbonate resin had 100° C. transferability and excellent birefringence. Further, the substrate disks had excellent resistance to moist heat.

Comparative Example 1

A polycarbonate resin was continuously produced in substantially the same manner as in Example 1, except that the reaction conditions were changed as follows. Prepolymer 1 was fed to the second stage agitation type polymerizer vessel at a flow rate of 10.0 kg/hr; the first stage wire-wetting fall polymerization was carried out at 250° C. and under a pressure of 6.3 mmHg; the second stage wire-wetting fall polymerization was carried out at 280° C.; and the amount of the prepolymer or polymer held in each of the second stage and the third stage agitation type polymerizer vessels, and the first stage and the second stage wire-wetting fall polymerizers was decreased to ½ of that in Example 1. The reaction conditions are shown in Table 3.

Various properties of the produced polycarbonate resin were evaluated in accordance with the above-mentioned evaluation methods. The results are shown in Table 7.

Further, using the produced polycarbonate resin, DVD substrate disks were produced by the above-mentioned production method, and the properties of the produced substrates were evaluated in accordance with the above-mentioned evaluation methods. The results are shown in Table 8.

As can be seen from Table 8, when DVD substrate disks were produced at a molding temperature of 370° C. using the polycarbonate resin produced in Comparative Example 1 (which contains heterounit (A) in an amount of less than 50 mole %, based on the total molar amount of heterounit (A) and heterounit (B)), the transferability of the substrates was unsatisfactory. Therefore, further DVD substrate disks were produced by molding the polycarbonate resin at 390° C. in an attempt to obtain a satisfactory transferability. However, the obtained substrate disks had linear optical defects which are detectable using a polarization filter. The reason for such defects are considered to be that the molecular weight of the polycarbonate resin was lowered by heat deterioration in the injection molding machine, and the resultant low molecular weight polycarbonate resin oozed out from the nozzle of the injection molding machine into the mold containing a high molecular weight polycarbonate resin, so that the resultant molded article (DVD substrate disk) is caused to have a linear optical defects formed by the low molecular weight polycarbonate resin.

In addition, when the substrate disks were subjected to a test for evaluating the resistance to moist heat at 90° C., optical defects markedly occurred.

Comparative Example 2

A polycarbonate resin was continuously produced in substantially the same manner-as in Example 1, except that the reaction conditions were changed as follows. A polymerizable material comprising bisphenol A and diphenyl carbonate, wherein the molar ratio of diphenyl carbonate to bisphenol A was 1.06, was used; prepolymer 1 was fed to the second stage agitation type polymerizer vessel at a flow rate of 12.0 kg/hr; the third stage agitation type polymerization was carried out at 240° C. and under a pressure of 20 mmHg; the first stage wire-wetting fall polymerization was carried out at 250° C. and under a pressure of 0.5 mmHg; the second stage wire-wetting fall polymerization was carried out at 250° C. and under a pressure of 0.2 mmHg; and the amount of the prepolymer or polymer held in each of the second stage and the third stage agitation type polymerizer vessels, and the first stage and the second stage wire-wetting fall polymerizers was decreased to ½ of that in Example 1. The reaction conditions are shown in Table 4.

Various properties of the produced polycarbonate resin were evaluated in accordance with the above-mentioned evaluation methods. The results are shown in Table 7.

Further, using the produced polycarbonate resin, disk-shaped substrates for DVD were produced by the above-mentioned production method, and the properties of the produced substrates were evaluated in accordance with the above-mentioned evaluation methods. The results are shown in Table 8.

As can be seen from Table 8, when DVD substrate disks were produced at a molding temperature of 370° C. using the polycarbonate resin produced in Comparative Example 2 (in which the sum of the amounts of heterounit (A) and heterounit (B) is less than 0.03 mole %, based on the total molar amount of recurring units (1)), the transferability of the substrates was unsatisfactory. Therefore, further DVD substrate disks were produced by molding the polycarbonate resin at 390° C. in an attempt to obtain a satisfactory transferability. However, the obtained substrate disks had linear optical defects which are detectable using a polarization filter.

Comparative Example 3

A polycarbonate resin was continuously produced in substantially the same manner as in Example 1, except that the reaction conditions were changed as follows. Prepolymer 1 was fed to the second stage agitation type polymerizer vessel at a flow rate of 2.1 kg/hr. The reaction conditions are shown in Table 5.

Various-properties of the produced polycarbonate resin were evaluated in accordance with the above-mentioned evaluation methods. The results are shown in Table 7.

Further, using the produced polycarbonate resin, disk-shaped substrates for DVD were produced by the above-mentioned production method, and the properties of the produced substrates were evaluated in accordance with the above-mentioned evaluation methods. The results are shown in Table 8.

As can be seen from Table 8, when DVD substrate disks were produced at a molding temperature of 370° C. using the polycarbonate resin produced in Comparative Example 3 (in which the sum of the amounts of heterounit (A) and heterounit (B) exceeds 0.30 mole %, based on the total molar amount of recurring units (1)), the produced substrates were satisfactory in respect of the birefringence and the transferability. However, when the substrates were subjected to a test for evaluating the resistance to moist heat at 90° C., optical defects markedly occurred. In addition, the mechanical strength of the substrate disks was low and the cracking of the substrates occurred during the flexural test.

Comparative Example 4

A polycarbonate resin was continuously produced in substantially the same manner as in Example 1, except that the reaction conditions were changed as follows. A poymerizable material comprising bisphenol A and diphenyl carbonate, wherein the molar ratio of diphenyl carbonate to bisphenol A was 1.12, was used; and the second stage wire-wetting fall polymerization was carried out under a pressure of 0.3 mmHg. (The reaction temperatures and the residence times were the same as described in Table 1 which shows the reaction conditions in Example 1.)

Various properties of the produced polycarbonate resin were evaluated in accordance with the above-mentioned evaluation methods. The results are shown in Table 7.

Further, using the produced polycarbonate resin, disk-shaped substrates for DVD were produced by the above-mentioned method, and the properties of the produced substrates were evaluated in accordance with the above-mentioned evaluation methods. The results are shown in Table 8.

As can be seen from Table 8, when DVD substrate disks were produced at a molding temperature of 370° C. using the produced polycarbonate resin having a weight average molecular weight exceeding 18,000, the transferability of the produced substrates was unsatisfactory. Therefore, further DVD substrate disks were produced by molding the polycarbonate resin at 390° C. in an attempt to obtain a satisfactory transferability. However, the produced DVD substrate disks had linear optical defects which are detectable using a polarization filter.

Comparative Example 5

A polycarbonate resin was continuously produced in substantially the same manner as in Example 1, except that the reaction conditions were changed as follows. A polymerizable material comprising bisphenol A and diphenyl carbonate, wherein the molar ratio of diphenyl carbonate to bisphenol A was 1.12, was used; and the second stage wire-wetting fall polymerization was carried out under a pressure of 0.8 mmHg. (The reaction temperatures and the residence times were the same as described in Table 1 which shows the reaction conditions in Example 1.) Various properties of the produced polycarbonate resin were evaluated in accordance with the above-mentioned evaluation methods. The results are shown in Table 7.

Further, using the obtained polycarbonate resin, disk-shaped-substrates for DVD were-produced by the above-mentioned production method, and the properties of the produced substrates were evaluated in accordance with the above-mentioned evaluation methods. The results are shown in Table 8.

As can be seen from Table 8, when DVD substrate disks were produced at a molding temperature of 370° C. using the produced polycarbonate resin produced in Comparative Example 5 (which has a weight average molecular weight of less than 13,000), the productions of some of the substrate disks suffered a unfavorouble phenomenon that the sprue could not be removed from the mold, so that satisfactory substrate disks could not be obtained. With respect to the substrate disks which were produced without suffering the above-mentioned unfavorouble phenomenon, the cracking of the substrate disks occurred during the flexural test.

Comparative Example 6

A polycarbonate resin was continuously produced in substantially the same manner as in Example 1, except that the reaction conditions were changed as follows. A polymerizable material comprising bisphenol A and 2-(3-carboxy-4-hydroxyphenyl)-2-(4'-hydroxyphenyl) propane (the molar ratio thereof to bisphenol A:0.002) as aromatic-dihydroxy compounds, and diphenyl carbonate as a carbonic diester (the molar ratio of diphenyl carbonate to bisphenol A:1.05) was used; prepolymer 1 was fed to the second stage agitation type polymerizer vessel at a flow rate of 12.0 kg/hr; the third stage agitation type polymerization was carried out at 230° C. and under a pressure of 10 mmHg; the first stage wire-wetting fall polymerization was carried out at 240° C. and under a pressure of 0.3 mmHg; the second stage wire-wetting fall polymerization was carried out at 240° C. and under a pressure of 0.1 mmHg. The produced polycarbonate resin was fed into a twin-screw type extruder having a temperature of 300° C., to thereby obtain polycarbonate resin pellets. The reaction conditions are shown in Table 6.

Various properties of the obtained polycarbonate resin were evaluated in accordance with the above-mentioned evaluation methods. The results are shown in Table 7.

Further, using the obtained polycarbonate resin, disk-shaped substrates for DVD were produced by the above-mentioned production method, and the properties of the produced substrate disks were evaluated in accordance with the above-mentioned evaluation methods. The results are shown in Table 8.

As can be seen from Table 8, when DVD substrate disks were produced at a molding temperature of 370° C. using the polycarbonate resin produced in Comparative Example 6 (which contains no heterounit (B)), both birefringence and transferability of the produced substrate disks were satisfactory. However, the substrate disks exhibited a poor resistance to moist heat, that is, optical defects markedly occurred during the test for evaluating the resistance to moist heat. In addition, the substrate disks had only a poor mechanical strength, so that the cracking of the substrate disks occurred during the flexural test.

TABLE 1

[Reaction Conditions in Example 1]

| Reaction Zones | Temperature (° C.) | Residence time (hr) | (ki × Ti × Hi) | $\sum_{i=1}^{N}(ki \times Ti \times Hi)$ in the process of Example 1 |
|---|---|---|---|---|
| First stage agitation type polymerizer vessel | 180 | 14.00 | 0.183 | 0.67 |
| Conduit | 180 | 0.38 | 0.005 | |
| Second stage agitation type polymerizer vessel | 230 | 4.50 | 0.084 | |
| Conduit | 230 | 0.13 | 0.002 | |
| Third stage agitation type polymerizer vessel | 240 | 5.19 | 0.094 | |
| Conduit | 260 | 1.01 | 0.089 | |
| First stage wire-wetting fall polymerizer | 260 | 1.08 | 0.095 | |
| Conduit | 260 | 0.06 | 0.005 | |
| Second stage wire-wetting fall polymerizer | 260 | 1.10 | 0.097 | |
| Conduit | 260 | 0.12 | 0.011 | |

Note:
In each of Tables 1–6; each "conduit" item between the polymerizer items shows the reaction conditions in a conduit between a polymerizer mentioned above the "conduit" item and a polymerizer mentioned below the "conduit" item, and the "conduit" item at the lowermost row shows the reaction conditions in a conduit between the last polymerizer (for a final product) and a withdrawal nozzle.

TABLE 2

[Reaction Conditions in Example 2]

| Reaction zones | Temperature (° C.) | Residence time (hr) | (ki × Ti × Hi) | $\sum_{i=1}^{N}(ki \times Ti \times Hi)$ in the process of Example 2 |
|---|---|---|---|---|
| First stage agitation type polymerizer vessel | 180 | 20.7 | 0.270 | 1.08 |
| Conduit | 180 | 0.6 | 0.008 | |
| Second stage agitation type polymerizer vessel | 230 | 7.5 | 0.140 | |
| Conduit | 230 | 0.2 | 0.004 | |
| Third stage agitation type polymerizer vessel | 240 | 8.6 | 0.156 | |
| Conduit | 260 | 1.7 | 0.149 | |
| First stage wire-wetting fall polymerizer | 260 | 1.8 | 0.159 | |
| Conduit | 260 | 0.1 | 0.009 | |
| Second stage wire-wetting fall | 260 | 1.8 | 0.162 | |

TABLE 2-continued

[Reaction Conditions in Example 2]

| Reaction zones | Temperature (° C.) | Residence time (hr) | (ki × Ti × Hi) | $\sum_{i=1}^{N} (ki \times Ti \times Hi)$ in the process of Example 2 |
|---|---|---|---|---|
| polymerizer | | | | |
| Conduit | 260 | 0.2 | 0.018 | |

TABLE 3

[Reaction Conditions in Comparative Example 1]

| Reaction zones | Temperature (° C.) | Residence time (hr) | (ki × Ti × Hi) | $\sum_{i=1}^{N} (ki \times Ti \times Hi)$ in the process of Comparative Example 1 |
|---|---|---|---|---|
| First stage agitation type polymerizer vessel | 180 | 12.0 | 0.157 | 2.03 |
| Conduit | 180 | 0.3 | 0.004 | |
| Second stage agitation type polymerizer vessel | 230 | 1.8 | 0.034 | |
| Conduit | 230 | 0.1 | 0.002 | |
| Third stage agitation type polymerizer vessel | 240 | 2.1 | 0.037 | |
| Conduit | 250 | 0.8 | 0.033 | |
| First stage wire-wetting fall polymerizer | 250 | 0.4 | 0.018 | |
| Conduit | 250 | 0.05 | 0.002 | |
| Second stage wire-wetting fall polymerizer | 280 | 0.4 | 1.594 | |
| Conduit | 275 | 0.1 | 0.145 | |

TABLE 4

[Reaction Conditions in Comparative Example 2]

| Reaction zones | Temperature (° C.) | Residence time (hr) | (ki × Ti × Hi) | $\sum_{i=1}^{N} (ki \times Ti \times Hi)$ in the process of Comparative Example 2 |
|---|---|---|---|---|
| First stage agitation type polymerizer vessel | 180 | 10.7 | 0.139 | 0.27 |
| Conduit | 180 | 0.3 | 0.003 | |
| Second stage agitation type polymerizer vessel | 230 | 1.5 | 0.028 | |
| Conduit | 230 | 0.1 | 0.002 | |
| Third stage agitation type polymerizer vessel | 240 | 1.7 | 0.031 | |
| Conduit | 250 | 0.7 | 0.028 | |
| First stage wire-wetting fall polymerizer | 250 | 0.4 | 0.015 | |
| Conduit | 250 | 0.04 | 0.002 | |
| Second stage wire-wetting fall | 250 | 0.4 | 0.015 | |

TABLE 4-continued

[Reaction Conditions in Comparative Example 2]

| Reaction zones | Temperature (° C.) | Residence time (hr) | (ki × Ti × Hi) | $\sum_{i=1}^{N} (ki \times Ti \times Hi)$ in the process of Comparative Example 2 |
|---|---|---|---|---|
| polymerizer | | | | |
| Conduit | 250 | 0.1 | 0.003 | |

TABLE 5

[Reaction Conditions in Comparative Example 3]

| Reaction zones | Temperature (° C.) | Residence time (hr) | (ki × Ti × Hi) | $\sum_{i=1}^{N} (ki \times Ti \times Hi)$ In the process of Comparative Example 3 |
|---|---|---|---|---|
| First stage agitation type polymerizer vessel | 180 | 42.10 | 0.549 | 2.38 |
| Conduit | 180 | 1.43 | 0.019 | |
| Second stage agitation type polymerizer vessel | 230 | 17.13 | 0.321 | |
| Conduit | 230 | 0.48 | 0.009 | |
| Third stage agitation type polymerizer vessel | 240 | 19.76 | 0.357 | |
| Conduit | 260 | 3.85 | 0.341 | |
| First stage wire-wetting fall polymerizer | 260 | 4.11 | 0.363 | |
| Conduit | 260 | 0.24 | 0.021 | |
| Second stage wire-wetting fall polymerizer | 260 | 4.20 | 0.371 | |
| Conduit | 260 | 0.47 | 0.042 | |

TABLE 6

[Reaction Conditions in Comparative Example 6]

| Reaction zones | Temperature (° C.) | Residence time (hr) | (ki × Ti × Hi) | $\sum_{i=1}^{N} (ki \times Ti \times Hi)$ in the process of Comparative Example 6 |
|---|---|---|---|---|
| First stage agitation type polymerizer vessel | 180 | 10.67 | 0.139 | 0.26 |
| Conduit | 180 | 0.25 | 0.003 | |
| Second stage agitation type polymerizer vessel | 230 | 3.00 | 0.056 | |
| Conduit | 230 | 0.08 | 0.002 | |
| Third stage agitation type polymerizer vessel | 230 | 3.46 | 0.027 | |
| Conduit | 230 | 0.67 | 0.005 | |
| First stage wire-wetting fall polymerizer | 240 | 0.72 | 0.013 | |
| Conduit | 240 | 0.04 | 0.001 | |
| Second stage wire- | 240 | 0.73 | 0.013 | |

TABLE 6-continued

[Reaction Conditions in Comparative Example 6]

| Reaction zones | Temperature (° C.) | Residence time (hr) | (ki × Ti × Hi) | $\sum_{i=1}^{N}(ki \times Ti \times Hi)$ in the process of Comparative Example 6 |
|---|---|---|---|---|
| wetting fall polymerizer Conduit | 240 | 0.08 | 0.001 | |

TABLE 7

| | Weight average molecular weight | Sum of the amounts of heterounit (A) and heterounit (B), based on the total molar amount of recurring units (1) (mole %) | Amount of heterounit (A), based on the total molar amount of heterounit (A) and heterounit (B) (mole %) | Amount of terminal hydroxyl groups (mole %) | Amount of particulate heat deterioration product (particles/100 g) |
|---|---|---|---|---|---|
| Ex. 1 | 15,300 | 0.143 | 95 | 32 | 1 |
| Ex. 2 | 15,200 | 0.198 | 86 | 27 | 45 |
| Comp. Ex. 1 | 15,200 | 0.094 | 38 | 26 | 8 |
| Comp. Ex. 2 | 15,300 | 0.018 | 90 | 35 | 2 |
| Comp. Ex. 3 | 15,300 | 0.315 | 86 | 10 | 18 |
| Comp. Ex. 4 | 19,000 | 0.148 | 83 | 20 | 16 |
| Comp. Ex. 5 | 12,000 | 0.120 | 94 | 26 | 10 |
| Comp. Ex. 6 | 15,400 | 0.200 | 100 | 30 | 0 |

TABLE 8

| | Molding Temp.: 370° C. | | Molding Temp.: 390° C. | | Resistance to moist heat at 90° C. | Substrate strength |
|---|---|---|---|---|---|---|
| | Birefringence (nm) | Transferability (%) | Birefringence (nm) | Transferability (%) | | |
| Ex. 1 | 12 | 100 | —*1) | —*1) | ○ | ○ |
| Ex. 2 | 10 | 100 | —*1) | —*1) | ○ | Δ |
| Comp. Ex. 1 | 28 | 83 | Poor moldability*2) | Poor moldability*2) | X | ○ |
| Comp. Ex. 2 | 37 | 69 | Poor moldability*2) | Poor moldability*2) | ○ | ○ |
| Comp. Ex. 3 | 8 | 100 | —*1) | —*1) | X | X |
| Comp. Ex. 4 | 88 | 30 | Poor moldability*2) | Poor moldability*2) | ○ | ○ |
| Comp. Ex. 5 | 5 | 100 | —*1) | —*1) | ○ | X |
| Comp. Ex. 6 | 15 | 98 | —*1) | —*1) | X | X |

Notes:
*1): Excellent transferability was acheieved by a substrate produced by molding the polycarbonate resin at 370° C. Therefore, production of a substrate by molding the polycarbonate resin at 390° C. was omitted.
*2): The disk-shaped substrates could not be used as substrates for an optical information medium, because the substrates had linear defects which were detectable using a polarization filter. Therefore, birefringence and transferability of such disks were not evaluated.

Example 3

A polymerization reaction was performed in the same manner as in Example 1 to thereby produce a polycarbonate resin. The produced polycarbonate resin was fed into a twin-screw type extruder in substantially the same manner as in Example 1, except that $1.0 \times 10^{-4}$ parts by weight of butyl p-toluenesulfonate was also fed into the extruder, to thereby obtain a polycarbonate resin composition.

Various properties of the obtained polycarbonate resin composition were evaluated in accordance with the above-mentioned evaluation methods. The results are shown in Table 9.

Further, using the obtained polycarbonate resin composition, disk-shaped substrates for DVD were produced by the above-mentioned production method, and the properties of the prepared substrates were evaluated in accordance with the above-mentioned evaluation methods. The results are shown in Table 10.

As can be seen from Table 10, the obtained polycarbonate resin composition had excellent moldability at 370° C. Specifically, as shown in Table 10, the DVD substrate disks produced using the obtained polycarbonate resin composition had not only 100% transferability, but also excellent birefringence. Further, the substrate disks had excellent resistance to moist heat and mechanical strength.

Example 4

A polycarbonate resin composition was obtained in substantially the same manner as in Example 3, except that a polycarbonate resin produced in the same manner as in Example 2 was used.

Various properties of the obtained polycarbonate resin composition were evaluated in accordance with the above-mentioned evaluation methods. The results are shown in Table 9.

Further, using the obtained polycarbonate resin composition, disk-shaped substrates for DVD were produced by the above-mentioned production method, and the properties of the produced substrates were evaluated in accordance with the above-mentioned evaluation methods. The results are shown in Table 10.

As can be seen from Table 10, the obtained polycarbonate resin composition had excellent moldability at 370° C. Specifically, even though one of the substrate disks broke during the evaluation of the mechanical strength, the substrate disks produced using the obtained polycarbonate resin composition had not only 100% transferability, but also excellent birefringence. Further, the substrate disks had excellent resistance to moist heat, and excellent mechanical strength.

Comparative Examples 7 to 11

Polycarbonate resin compositions were produced in substantially the same manner as in Example 3, except that polycarbonate resins produced in the same manner as in Comparative Examples 1 to 5 were used as polycarbonate resins.

Various properties of the obtained polycarbonate resin compositions were evaluated in accordance with the above-mentioned evaluation methods. The results are shown in Table 9.

Further, using the obtained polycarbonate resin compositions, disk-shaped substrates for DVD were produced by the above-mentioned production method, and the properties of the prepared substrates were evaluated in accordance with the above-mentioned evaluation methods. The results are shown in Table 10.

As can be seen from Table 10, the transferability of each of the DVD substrate disks was unsatisfactory when the substrate disks were produced at a molding temperature of 370° C. using the following polycarbonate resin compositions: the polycarbonate resin composition of Comparative Example 7 in which the amount of heterounit (A) contained in the polycarbonate resin is less than 50 mole %, based on the total molar amount of heterounit (A) and heterounit (B); the polycarbonate resin composition of Comparative Example 8 in which the sum of amount of heterounit (A) and heterounit (B) contained in the polycarbonate resin is less than 0.03 mole %, based on the total molar amount of recurring units (1); and the polycarbonate resin composition of Comparative Example 10 in which the weight average molecular weight of the polycarbonate resin exceeds 18,000. Therefore, further DVD substrate disks were prepared by molding the polycarbonate resin compositions at 390° C. in an attempt to obtain a satisfactory transferability. However, the obtained substrate disks had linear defects which are detectable using a polarization filter. The reason for such defects are considered to be that the molecular weight of the polycarbonate resin was lowered by heat deterioration in the injection molding machine, and the resultant low molecular weight polycarbonate resin oozed out from the nozzle of the injection molding machine into the mold containing a high molecular weight polycarbonate resin, so that the resultant molded article (DVD substrate disk) is caused to have a linear optical defects formed by the low molecular weight polycarbonate resin.

When DVD substrate disks were produced at a molding temperature of 370° C. using the polycarbonate resin composition of Comparative Example 9 in which the sum of the amounts of heterounit (A) and heterounit (B) contained in the polycarbonate resin exceeds 0.30 mole %, based on the total molar amount of recurring units (1), the production of the substrate disks could be successfully conducted. Further, the produced substrate disks exhibited excellent transferability. However, when the substrate disks were subjected to a test for evaluating the resistance to moist heat, optical defects markedly occurred. In addition, the mechanical strength of the substrate disks was low and the cracking of the substrate disks occurred during the flexural test.

When DVD substrate disks are produced at a molding temperature of 370° C. using the polycarbonate resin composition of Comparative Example 11 in which the weight average molecular weight of the polycarbonate resin is less than 13,000, the productions of some of the substrate disks suffered a unfavourouble phenomenon that the sprue could not be removed from the mold, so that satisfactory substrate disks were not obtained. With respect to the substrate disks which could be produced without suffering the above-mentioned unfavourouble phenomenon, the cracking of the substrate disks occurred during the flexural test.

Comparative Examples 12 and 13

Polycarbonate resin compositions were prepared in substantially the same manner as in Example 3 except that the amount of an acidic compound was varied as shown in Table 9.

Various properties of the obtained polycarbonate resin compositions were evaluated in accordance with the above-mentioned evaluation methods. The results are shown in Table 9.

Further, using the obtained polycarbonate resin compositions, disk-shaped substrates for DVD were produced by the above-mentioned method, and the properties of the prepared substrates were evaluated in accordance with the above-mentioned evaluation methods. The results are shown in Table 10.

As can be seen from Table 10, with respect to each of the DVD substrate disks produced by molding the polycarbonate resin composition of Comparative Example 12 containing an acidic compound in an amount less than $0.1 \times 10^{-4}$ parts by weight, and the DVD substrate disks produced by molding the polycarbonate resin composition of Comparative Example 13 containing an acidic compound in an amount exceeding $100 \times 10^{-4}$ parts by weight, optical defects markedly occurred during the evaluation of the resistance to moist heat at 110° C.

Comparative Example 14

A polycarbonate resin composition was prepared in substantially the same manner as in Example 3, except that a polycarbonate resin produced in the same manner as in Comparative Example 6 was used.

Various properties of the obtained polycarbonate resin composition were evaluated in accordance with the above-mentioned evaluation methods. The results are shown in Table 9.

Further, using the obtained polycarbonate resin composition, disk-shaped substrates for DVD were produced by the above-mentioned production method, and the properties of the produced substrates were evaluated in accordance with the above-mentioned evaluation methods. The results are shown in Table 10.

As can be seen from Table 10, when DVD substrate disks were produced at a molding temperature of 370° C. using the obtained polycarbonate resin composition in which the polycarbonate resin contains no heterounit (B), optical defects markedly occurred in the test for evaluating the resistance to moist heat at 110° C. In addition, the mechanical strength of the substrate disks was low, and the cracking of the substrate disks occurred during the flexural test.

TABLE 9

| | Weight Average molecular weight | Sum of the amounts of heterounit (A) and heterounit (B), based on the total molar amount of recurring units (1) (mole %) | Amount of heterounit (A), based on the total molar amount of heterounit (A) and heterounit (B) (mole %) | Amount of terminal hydroxyl groups (mole %) | Amount of particulate heat deterioration product (particles/100 g) | Amount of acidic compound added (×10⁻⁴ parts by weight) |
|---|---|---|---|---|---|---|
| Ex. 3 | 15,300 | 0.143 | 95 | 32 | 1 | 1.00 |
| Ex. 4 | 15,200 | 0.198 | 86 | 27 | 45 | 1.00 |
| Comp. Ex. 7 | 15,200 | 0.094 | 38 | 26 | 8 | 1.00 |
| Comp. Ex. 8 | 15,300 | 0.018 | 90 | 35 | 2 | 1.00 |
| Comp. Ex. 9 | 15,300 | 0.315 | 86 | 10 | 18 | 1.00 |
| Comp. Ex. 10 | 19,000 | 0.148 | 83 | 20 | 16 | 1.00 |
| Comp. Ex. 11 | 12,000 | 0.120 | 94 | 26 | 10 | 1.00 |
| Comp. Ex. 12 | 15,300 | 0.143 | 95 | 32 | 1 | 0.08 |
| Comp. Ex. 13 | 15,300 | 0.143 | 95 | 32 | 1 | 150.00 |
| Comp. Ex. 14 | 15,400 | 0.200 | 100 | 30 | 0 | 1.00 |

TABLE 10

| | Molding temp.: 370° C. | | Resistance to moist heat at 110° C. | | |
|---|---|---|---|---|---|
| | Birefringence (nm) | Transferability (%) | Amount of optical defects having a diameter of 200 μm or more | Amount of optical microdefects having a diameter less than 200 μm | Mechanical strength |
| Ex. 3 | 12 | 100 | 3 | 0 | ○ |
| Ex. 4 | 10 | 100 | 9 | 13 | Δ |
| Comp. Ex. 7 | 28 | 83 | 15 | 23 | ○ |
| Comp. Ex. 8 | 37 | 69 | 1 | 3 | ○ |
| Comp. Ex. 9 | 8 | 100 | 30 | 58 | X |
| Comp. Ex. 10 | 88 | 30 | 2 | 2 | ○ |
| Comp. Ex. 11 | 5 | 100 | 50 | >100 | X |
| Comp. Ex. 12 | 11 | 100 | 15 | >100 | ○ |
| Comp. Ex. 13 | 12 | 100 | >100 | >100 | ○ |
| Comp. Ex. 14 | 15 | 98 | >100 | >100 | X |

INDUSTRIAL APPLICABILITY

The polycarbonate resin of the present invention exhibits a high melt fluidity during the injection molding thereof. By virtue of this property, the polycarbonate resin of the present invention can be advantageously used for producing an excellent substrate for an optical information medium, wherein the substrate has not only excellent optical properties, such as a low birefringence, but also a high precision transferability of information (that is, information of a stamper (a mold for forming microgrooves and micropits on a substrate) can be transferred to the substrate with high precision). Therefore, the polycarbonate resin of the present invention can be advantageously used for producing a substrate for an optical information medium, such as a CD, a CD-ROM, a CD-R, a CD-RW, a DVD-ROM, a DVD-R, a DVD-RW, an MD and an MO.

What is claimed is:

1. A polycarbonate resin for use in the production of a substrate for an optical information medium, which is produced by subjecting an aromatic dihydroxy compound and a carbonic diester to a transesterification reaction, and is substantially free of a chlorine atom, said polycarbonate resin comprising a plurality of aromatic polycarbonate main chains, each comprising recurring units each independently represented by the following formula (1):

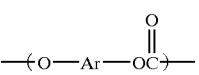

(1)

wherein Ar represents a divalent $C_5$–$C_{200}$ aromatic group, wherein said plurality of aromatic polycarbonate main chains collectively contain therein at least one heterounit (A) and at least one heterounit (B), said heterounit (A) being represented by the following formula (2):

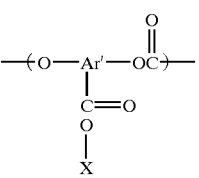

(2)

wherein Ar' represents a trivalent $C_5$–$C_{200}$ aromatic group, and X represents a polycarbonate chain having recurring units each represented by the formula

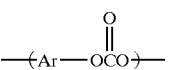

wherein Ar is as defined above and having a molecular weight of from 214 to 6,000, and wherein, when said polycarbonate main chains contain a plurality of heterounits (A), the heterounits (A) are the same or different, said heterounit (B) being represented by the following formula (3):

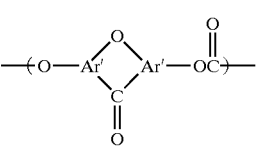

(3)

wherein Ar' is as defined above, and wherein, when said polycarbonate main chains contain a plurality of heterounits (B), the heterounits (B) are the same or different, wherein said X in formula (2) optionally contains at least one heterounit selected from the group consisting of heterounits (A) and (B), the sum of the amounts of said heterounit (A) and said heterounit (B) being from 0.03 to 0.3 mole %, based on the total molar amount of said recurring units (1), the amount of said heterounit (A) being at least 50 mole %, based on the total molar amount of said heterounit (A) and said heterounit (B), said polycarbonate resin having a weight average molecular weight (Mw) of from 13,000 to 18,000.

2. The polycarbonate resin according to claim 1, which contains a particulate heat deterioration product in an amount of not more than 20 particles, relative to 100 g of said polycarbonate resin, each particle of the heat deterioration product having a particle size of 5 μm or more and having a heat deterioration degree of 0.2 or more as measured in terms of an absorption intensity ratio $A_1/A_2$, wherein $A_1$ represents the absorption intensity at the wave number of 1740 cm$^{-1}$, which is ascribed to the stretching vibration of a carbonyl group contained in the non-carbonate ester linkage present in said polycarbonate resin, and $A_2$ represents the absorption intensity at the wave number of 1780 cm$^{-1}$, which is ascribed to the stretching vibration of a carbonyl group of the carbonate ester linkage present in said polycarbonate resin, each absorption intensity being measured by infrared spectroscopy.

3. The polycarbonate resin according to claim 1, wherein said heterounit (A) is present in an amount of from 50 to 95 mole %, based on the total molar amount of said heterounit (A) and said heterounit (B).

4. The polycarbonate resin according to claim 1, which has terminal hydroxyl groups in an amount of from 5 to 50 mole %, based on the total molar amount of the terminal groups of said polycarbonate resin.

5. The polycarbonate resin according to claim 1, wherein 85% or more of said recurring units (1) are each represented by the following formula (1'):

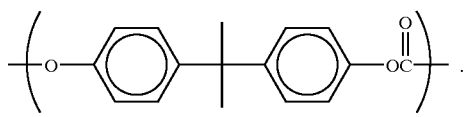

(1')

6. A substrate for an optical information medium, which is produced by molding the polycarbonate resin of claim 1.

7. A polycarbonate resin composition for use in the production of a substrate for an optical information medium, comprising:

(I) 100 parts by weight of the polycarbonate resin of claim 1; and (II) $0.1 \times 10^{-4}$ to $100 \times 10^{-4}$ parts by weight of an acidic compound.

8. A substrate for an optical information medium, which is produced by molding the polycarbonate resin composition of claim 7.

* * * * *